(12) United States Patent
Wang et al.

(10) Patent No.: US 11,956,860 B2
(45) Date of Patent: *Apr. 9, 2024

(54) SIGNAL TRANSMISSION METHOD, SIGNAL DETECTION METHOD AND APPARATUSES THEREOF AND COMMUNICATION SYSTEM

(71) Applicant: FUJITSU LIMITED, Kawasaki (JP)

(72) Inventors: Xin Wang, Beijing (CN); Qinyan Jiang, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,068

(22) Filed: Nov. 2, 2022

(65) Prior Publication Data

US 2023/0048775 A1 Feb. 16, 2023

Related U.S. Application Data

(63) Continuation of application No. 16/707,509, filed on Dec. 9, 2019, now Pat. No. 11,533,779, which is a
(Continued)

(30) Foreign Application Priority Data

Jun. 16, 2017 (WO) ................ PCT/CN2017/088780

(51) Int. Cl.
*H04W 72/04* (2023.01)
*H04L 5/00* (2006.01)
(Continued)

(52) U.S. Cl.
CPC ......... *H04W 88/184* (2013.01); *H04L 5/0055* (2013.01); *H04W 24/10* (2013.01); *H04W 56/0015* (2013.01); *H04W 72/0453* (2013.01)

(58) Field of Classification Search
CPC ... H04L 5/0007; H04L 5/0048; H04L 5/0055; H04L 5/0082; H04W 24/10;
(Continued)

(56) References Cited

U.S. PATENT DOCUMENTS 10,931,497 B2 * 2/2021 Sheng .............. H04W 36/0061
11,246,108 B2 * 2/2022 Zhou .................. H04W 56/001
(Continued)

FOREIGN PATENT DOCUMENTS

CN 106304346 A 1/2017
CN 106465173 A 2/2017
(Continued)

OTHER PUBLICATIONS

International Search Report with Written Opinion of the International Searching Authority issued by the State Intellectual Property Office of the P.R. China for corresponding International Patent Application No. PCT/CN2017/097164, dated Dec. 27, 2017, with an English translation.
(Continued)

*Primary Examiner* — Robert J Lopata
(74) *Attorney, Agent, or Firm* — Myers Wolin, LLC

(57) ABSTRACT

A signal transmission method, signal detection method and apparatuses thereof and communication system. The signal transmission apparatus includes a transmitting unit configured to transmit a synchronization signal (SS) block to a user equipment within a time window of a predetermined position in an SS block transmission period. Hence, UE cell search and measurement time is reduced, complexity at the UE is lowered, power consumption of the UE is lowered, cell handover is sped up, communication interruption is avoided, and currently at least one of existing problems is solved.

12 Claims, 14 Drawing Sheets

Related U.S. Application Data continuation of application No. PCT/CN2017/097164, filed on Aug. 11, 2017.

(51) Int. Cl.
| | |
|---|---|
| *H04W 24/10* | (2009.01) |
| *H04W 56/00* | (2009.01) |
| *H04W 72/0453* | (2023.01) |
| *H04W 88/18* | (2009.01) |

(58) Field of Classification Search
CPC . H04W 48/12; H04W 48/16; H04W 56/0015; H04W 72/0453; H04W 88/184
USPC .......................................................... 370/503
See application file for complete search history.

(56) References Cited

U.S. PATENT DOCUMENTS

| | | | | |
|---|---|---|---|---|
| 2011/0161821 | A1* | 6/2011 | Stewart | G06F 3/03545 715/731 |
| 2014/0201682 | A1* | 7/2014 | Lee | G06F 3/0481 715/846 |
| 2016/0192000 | A1* | 6/2016 | Kuo | H04N 21/472 725/41 |
| 2017/0070312 | A1 | 3/2017 | Yi et al. | |
| 2017/0201898 | A1 | 7/2017 | Park et al. | |
| 2018/0198659 | A1* | 7/2018 | Ko | H04L 5/005 |
| 2018/0205522 | A1 | 7/2018 | Wang et al. | |
| 2018/0227935 | A1* | 8/2018 | Zhou | H04W 72/12 |
| 2018/0279238 | A1* | 9/2018 | Zhou | H04W 72/12 |
| 2018/0324022 | A1* | 11/2018 | Sheng | H04L 27/2692 |
| 2019/0150110 | A1* | 5/2019 | Ko | H04W 72/30 370/350 |
| 2019/0200312 | A1 | 6/2019 | Ryu et al. | |
| 2019/0208479 | A1* | 7/2019 | Kim | H04L 27/2607 |
| 2020/0045662 | A1* | 2/2020 | Liu | H04W 48/12 |
| 2020/0053727 | A1* | 2/2020 | Zhang | H04W 72/04 |
| 2020/0059876 | A1* | 2/2020 | Zhang | H04L 5/0053 |
| 2020/0127879 | A1* | 4/2020 | Yokomakura | H04W 72/0453 |
| 2020/0136738 | A1* | 4/2020 | Zhang | H04W 76/27 |
| 2020/0145961 | A1* | 5/2020 | Harada | H04W 72/044 |
| 2020/0146041 | A1* | 5/2020 | Kim | H04J 11/0086 |
| 2020/0154376 | A1* | 5/2020 | Ko | H04W 72/30 |
| 2020/0178188 | A1* | 6/2020 | Zhao | H04W 72/04 |
| 2020/0187159 | A1* | 6/2020 | Ko | H04W 56/001 |
| 2020/0187161 | A1* | 6/2020 | Wu | H04L 27/2666 |
| 2020/0274750 | A1* | 8/2020 | Yi | H04L 27/2613 |

FOREIGN PATENT DOCUMENTS

| | | |
|---|---|---|
| CN | 106549738 A | 3/2017 |
| CN | 106686740 A | 5/2017 |
| CN | 106688288 A | 5/2017 |
| CN | 106793058 A | 5/2017 |
| JP | 2017-512438 A | 5/2017 |
| WO | 2015/026281 A1 | 2/2015 |

OTHER PUBLICATIONS

Fujitsu, "Consideration on timing indication based on SS block", Agenda Item: 5.1.1.1.3, 3GPP TSG-RAN WG1 Meeting #NR Ad-hoc#2, R1-1710231, Qingdao, P.R. China, Jun. 27-30, 2017.
Cohere Technologies, "NR SS Burst Composition and SS Time Index Indication", Agenda Item: 8.1.1.1.2, 3GPP TSG-RAN Meeting #88, R1-1702374, Athens, Greece, Feb. 13-17, 2017.
Cohere Technologies"SS Block Composition, SS Burst Set Composition and SS Time Index Indication", Agenda Item: 8.1.1.1.2, 3GPP TSG-RAN Meeting #88bis, R1-1705459, Spokane, USA, Apr. 3-7, 2017.
Fujitsu, "Discussion on DMRS for NR-PBCH", Agenda Item: 5.1.1.2.3, 3GPP TSG-RAN WG1 Meeting #NR Ad-hoc#2, R1-1710232, Qingdao, P.R. China, Jun. 27-30, 2017.
Communication pursuant to Article 94(3) EPC issued by the European Patent Office for corresponding European Patent Application No. 17 913 191.7-1216, dated Jul. 18, 2022.
Notice of Preliminary Rejection issued by the Korean Intellectual Property Office for corresponding Korean Patent Application No. 10-2019-7035920, dated Oct. 14, 2020, with a full English translation.
Examination Report issued by the Patent Office of India for corresponding Indian Patent Application No. 201937048292, dated Jan. 29, 2021, with a full English translation.
Extended European search report with supplementary European search report and the European search opinion issued by the European Patent Office for corresponding European Patent Application No. 17913191.7, dated Feb. 10, 2021.
Nokia et al., "On SS Burst and Burst Set composition", Agenda item:7.1.1.1.2, 3GPP TSG RAN WG1, Meeting #89, R1-1708232, Hangzhou, P.R. China, May 15-19, 2017.
Ericsson, "NR Synchronization Complexity and Periodicity", Agenda item:8.1.1.1.4, 3GPP TSG RAN WG1, Meeting #88, R1-1702122, Athens, Greece, Feb. 13-17, 2017.
AT&T, "NR SS block and burst set composition", Agenda item:7.1.1.1.2, 3GPP TSG RAN WG1, Meeting #89, R1-1707754, Hangzhou, China, May 15-19, 2017.
Samsung, "SS block composition, SS burst set composition and SS time index indication", Agenda item:8.1.1.1.2, 3GPP TSG RAN WG1, Meeting #88bis, R1-1705318, Spokane, USA, Apr. 3-7, 2017.
Intel Corporation, "Signaling configuration for xSS", Agenda item:10.4.1.4, 3GPP TSG RAN WG2, Meeting #98, R2-1704769 (Revision of R2-1703419), Hangzhou, China, May 15-19, 2017.
Notice of Reasons for Refusal issued by the Japan Patent Office for corresponding Japanese Patent Application No. 2019-566720, dated Feb. 16, 2021, with an English translation.
Intel Corporation, "SS block time index indication", Agenda Item:7.1.1.1.3, 3GPP TSG RAN WG1, Meeting RAN1 #89, R1-1707338, Hangzhou, P.R. China, May 15-19, 2017.
First Notification of Office Action and Search Report issued by the China National Intellectual Property Administration for corresponding Chinese Patent Application No. 201780090686.X, dated Apr. 27, 2021, with an English translation.
Notice of Preliminary Rejection issued by the Korean Intellectual Property Office for corresponding Korean Patent Application No. 10-2019-7035920, dated Apr. 30, 2021, with an English translation.
Second Notification of Office Action issued by the China National Intellectual Property Administration for corresponding Chinese Patent Application No. 201780090686.X, dated Dec. 13, 2021, with an English translation.
Notice of Final Rejection issued by the Korean Intellectual Property Office for corresponding Korean Patent Application No. 10-2019-7035920, dated Dec. 28, 2021, with an English translation.
Notice of Preliminary Rejection issued by the Korean Intellectual Property Office for corresponding Korean Patent Application No. 10-2022-7015562, dated Jul. 13, 2022, with an English translation.
International Search Report issued by the State Intellectual Property Office of the P.R. China for corresponding International Patent Application No. PCT/CN2017/088780, dated Feb. 26, 2018, with an English translation.
Zte et al., "NR-SS: Periodicity", Agenda Item: 5.1.1.1.3, 3GPP TSG-RAN WG1 AH_NR Meeting, R1-1700099, Spokane, USA, Jan. 16-20, 2017.
Non-Final Office Action issued by the United States Patent and Trademark Office for corresponding U.S. Appl. No. 16/707,509, dated Apr. 13, 2021.
Final Office Action issued by the United States Patent and Trademark Office for corresponding U.S. Appl. No. 16/707,509, dated Oct. 29, 2021.
Non-Final Office Action issued by the United States Patent and Trademark Office for corresponding U.S. Appl. No. 16/707,509, dated Mar. 1, 2022.
Notice of Allowance issued by the United States Patent and Trademark Office for corresponding U.S. Appl. No. 16/707,509, dated Aug. 5, 2022.

(56) References Cited

OTHER PUBLICATIONS

Provisional Application For United States Patent in the Names of Hyunsoo KO, et al., for Synchronization Signal and PBCH Design for NR System, U.S. Appl. No. 62/502,543, filed May 5, 2017.
Summons to attend oral proceedings pursuant to Rule 115(1) EPC issued by the European Patent Office for corresponding European Patent Application No. 17 913 191.7-1216, dated May 26, 2023.
Zte, "RRM measurements on Idle mode RS", Agenda Item: 7.1.1.5.1, 3GPP TSG-RAN WG1 Meeting #89, R1-1707050, Hangzhou, P.R. China, May 15-19, 2017.
Fujitsu, "On remaining details of synchronization signal", Agenda Item: 7.1.1, 3GPP TSG-RAN WG1 Meeting 90bis, R1-1717713, Prague, Czech Republic, Oct. 9-13, 2017.
Hearing Notice issued by the Intellectual Property Office of India for corresponding Indian Patent Application No. 201937048292, dated Jul. 21, 2023, with an English translation.

* cited by examiner

SIGNAL TRANSMISSION METHOD, SIGNAL DETECTION METHOD AND APPARATUSES THEREOF AND COMMUNICATION SYSTEM

CROSS REFERENCE TO RELATED APPLICATIONS

This application is a continuation of U.S. application Ser. No. 16/707,509 filed on Dec. 9, 2019, which is a continuation application of International Application No. PCT/CN2017/097164 filed on Aug. 11, 2017, which claims priority from International Application No. PCT/CN2017/088780 filed Jun. 16, 2017, the entire contents of each are incorporated herein by reference.

TECHNICAL FIELD

This disclosure relates to the field of communications, and in particular to a signal transmission method, a signal detection method and apparatuses thereof and a communication system.

BACKGROUND

In future wireless communication systems, such as 5G and New Radio (NR) systems, a supported range of working frequency points and bandwidth are relatively large, and at a higher working frequency point, beams are used to transmit data, and transmission gains may be obtained. For a synchronization signal (SS), a base station transmits synchronization signal blocks (SS blocks) by taking a synchronization signal burst set transmission period (e.g. an SS burst set transmission period) as a period, each SS burst set includes one or more SS bursts, each SS burst including one or more SS blocks. Each SS block may include a primary synchronization signal (PSS), a secondary synchronization signal (SSS), and/or a physical broadcast channel (PBCH).

During an initial access procedure of a user equipment (UE) accessing to a network, SS blocks transmitted by using different beams need to be detected by beam sweeping to obtain downlink synchronization. By detecting the SS blocks, the UE acknowledges its position within an SS burst set, that is, indices of the SS blocks in the SS burst set, so as to support frame timing at the UE.

Furthermore, the UE needs to detect the synchronization signals to implement the downlink synchronization in initial access to a cell, and in order to support mobility, after the initial access to the cell, the UE searches neighboring cells if signal quality of an own cell or a serving cell is poor, so as to obtain synchronization and measure received quality of signals of the neighboring cells and beam quality, thereby determining whether to perform cell handover or cell reselection. Moreover, if a carrier frequency of a neighboring cell and a carrier frequency of the own cell are different, or a carrier frequency at which the own cell is present is congested, the network may possibly schedule the UE to perform inter-frequency measurement. Even when signal quality of a wireless access mode of the own cell is poor (for example, the own cell is in an LTE system, while a neighboring cell is in an NR system), the network may possibly schedule the UE operating in the LTE mode to measure signal quality of the NR of the neighboring cell, i.e. inter-RAT measurement.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Currently, in a future wireless communication system, in performing mobility-related cell search and cell measurement, a UE needs to detect synchronization signals (SSs) in SS blocks; however, since a particular position for transmitting the SS block cannot be known, search can only be performed at a period of an SS burst set. Furthermore, except for those cases where a network equipment notifies the UE to measure a designated cell, the UE usually cannot know configuration information of its neighboring cells, such as information related to the SSs. Moreover, it is difficult for a serving base station to predict which neighboring cells of the UE are, and the UE needs to detect the SSs of the neighboring cells by searching the neighboring cells.

As in the future wireless communication system, multiple SS burst set transmission periods are supported, when the UE detects an SS block, the UE cannot know a particular position of a time window for transmitting the SS block, and can only perform search according to a maximum SS burst set period, which will increases time for the cell search and measurement by the UE, correspondingly increase complexity and power consumption of the UE in processing, and cause the UE to be unable to complete handover quickly and even interruption of communication. Furthermore, for scheduling of reception of other services by a cell, hybrid automatic repeat request (HARQ) processing, etc., will be affected.

In order to solve at least one of the above problems, embodiments of this disclosure provide a signal transmission method, a signal detection method and apparatuses thereof and a communication system. Time for cell search and measurement by a UE is reduced, complexity of processing at a UE is lowered, power consumption of the UE is lowered, cell handover is sped up, interruption of communication is avoided, and at least one of currently existed problems is solved.

According to a first aspect of the embodiments of this disclosure, there is provided a signal transmission method, including:
  transmitting a synchronization signal (SS) block to a user equipment within a time window of a predetermined position in an SS block transmission period.

According to a second aspect of the embodiments of this disclosure, there is provided a signal detection method, including:
  detecting a synchronization signal (SS) block within a time window of a predetermined position in an SS block transmission period.

According to a third aspect of the embodiments of this disclosure, there is provided a signal transmission apparatus, including:
  a transmitting unit configured to transmit a synchronization signal (SS) block to a user equipment within a time window of a predetermined position in an SS block transmission period.

According to a fourth aspect of the embodiments of this disclosure, there is provided a signal detection apparatus, including:
  a detecting unit configured to detect a synchronization signal (SS) block within a time window of a predetermined position in an SS block transmission period.

Advantages of the embodiments of this disclosure exist in that according to the embodiments of this disclosure, by pre-defining a position of a time window for transmitting one or more SS blocks at a network equipment and a user equipment, or configuring a position of a time window for transmitting one or more SS blocks by the network equipment, the UE is caused to detect the SS block within a time window of the predetermined position. Hence, UE cell search and measurement time is reduced, complexity at the UE is lowered, power consumption of the UE is lowered, cell handover is sped up, communication interruption is avoided, and at least one of currently existing problems is solved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort.

In the drawings:

FIG. 1 is a schematic diagram of transmitting synchronization signals by a base station in a future wireless communication system;

FIG. 2 is a schematic diagram of a structure of an SS block;

FIG. 3 is a schematic diagram of a signal transmission method in Embodiment 1;

FIGS. 4A and 4B are schematic diagrams of the predetermined position, respectively;

FIGS. 5A-5B are flowcharts of the signal transmitting method in Embodiment 2;

FIGS. 6A, 7A and 8A are schematic diagrams of transmitting an SS block time window in the relevant art;

FIGS. 6B, 7B and 8B are schematic diagrams of transmitting an SS block time window in Embodiment 2;

FIG. 9 is a flowchart of the signal transmission method in Embodiment 3;

FIG. 10 is a flowchart of the signal detection method in Embodiment 4;

FIGS. 11A, 12A, 13A and 14A are schematic diagrams of a signal detection time window in the relevant art;

FIGS. 11B, 12B, 13B and 14B are schematic diagrams of a signal detection time window in Embodiment 4;

Figure 15:
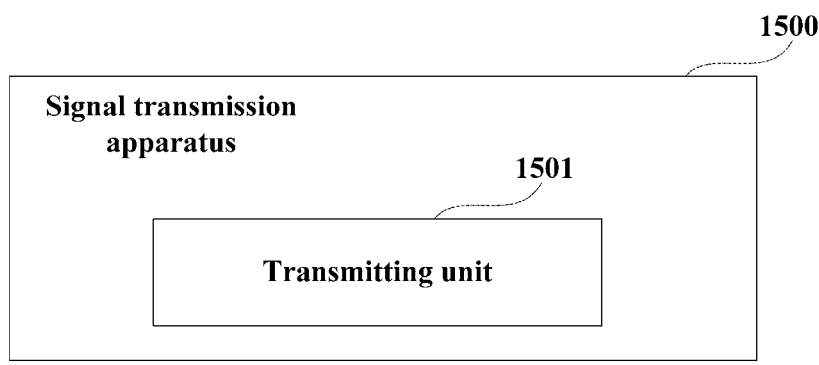
Figure 16:
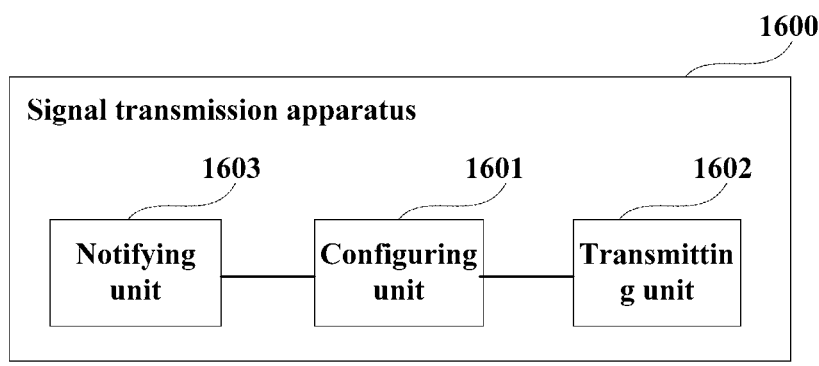
Figure 17:
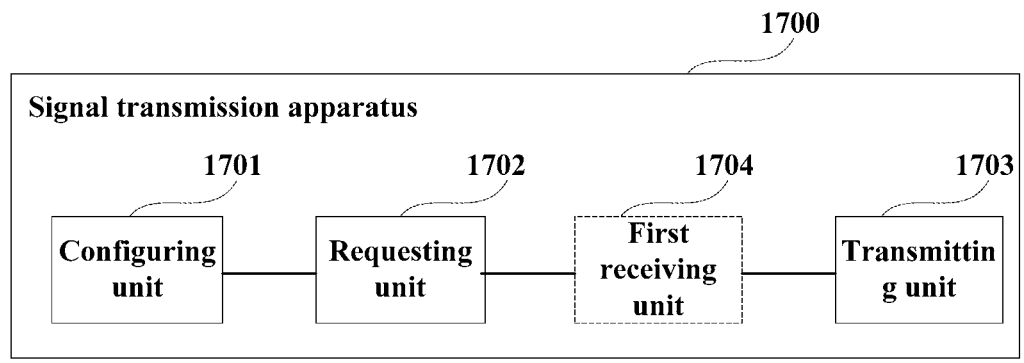
Figure 18:
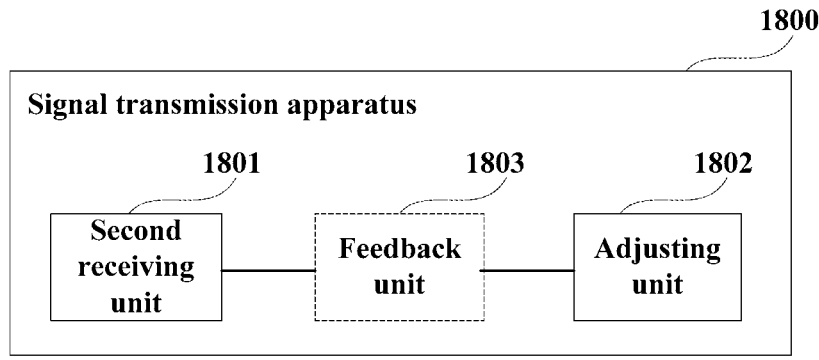
Figure 19:
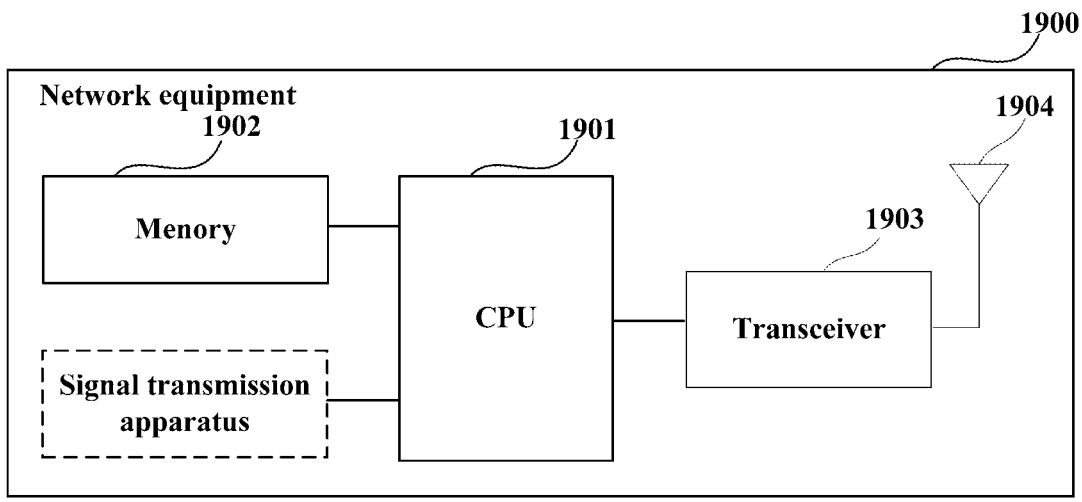
Figure 20:
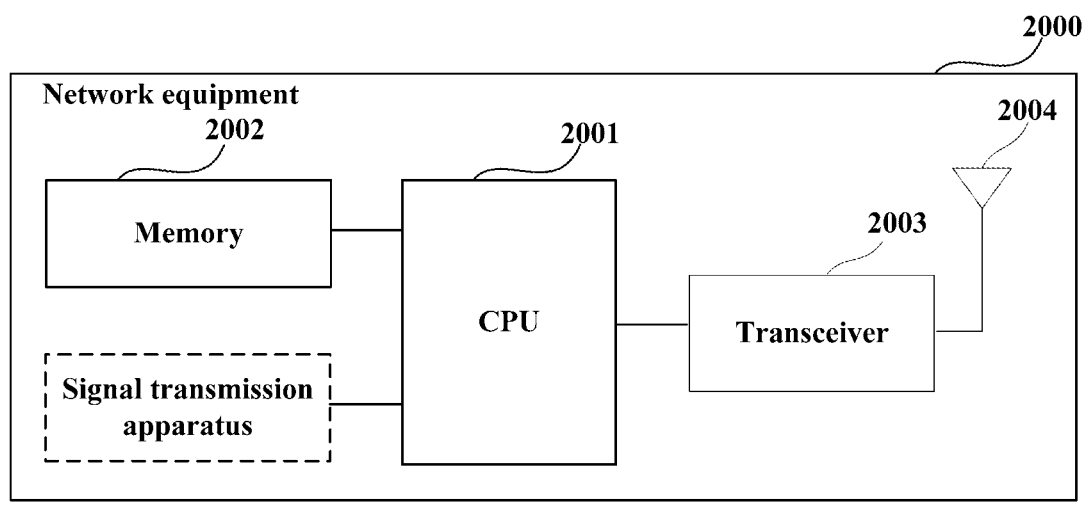
Figure 21:
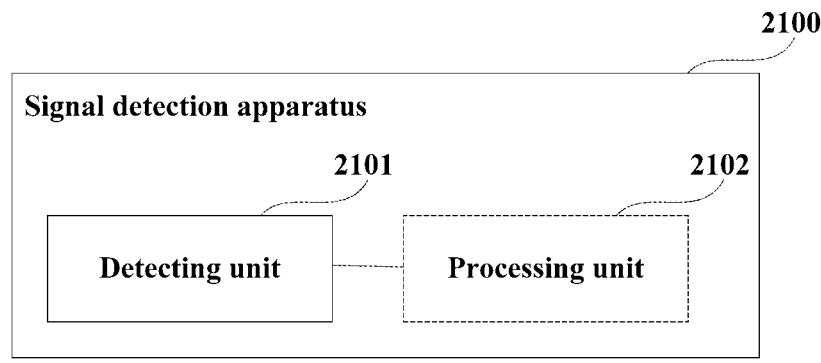
Figure 22:
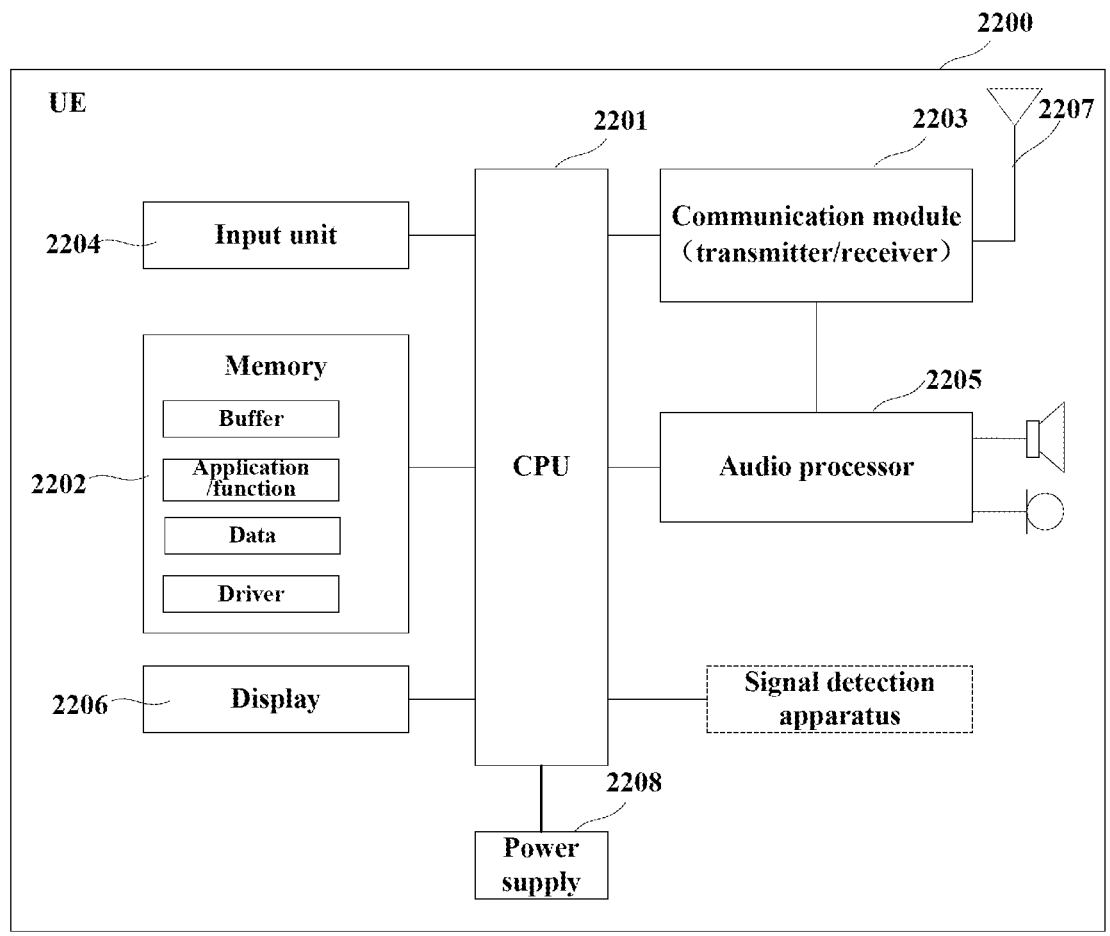
Figure 23:
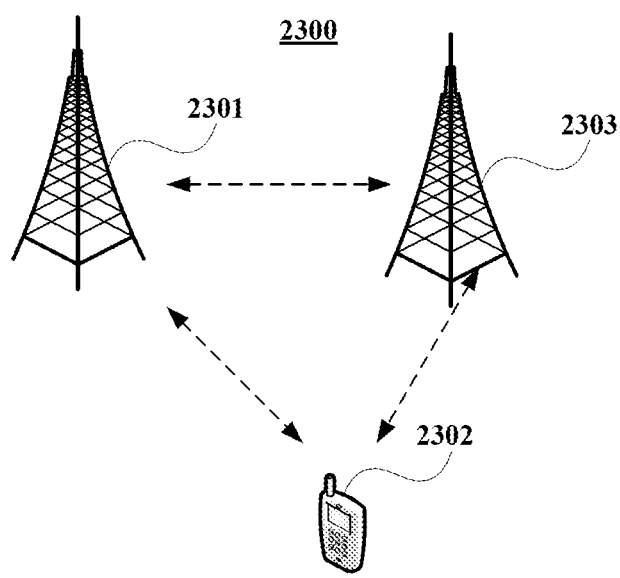
Figure 24:
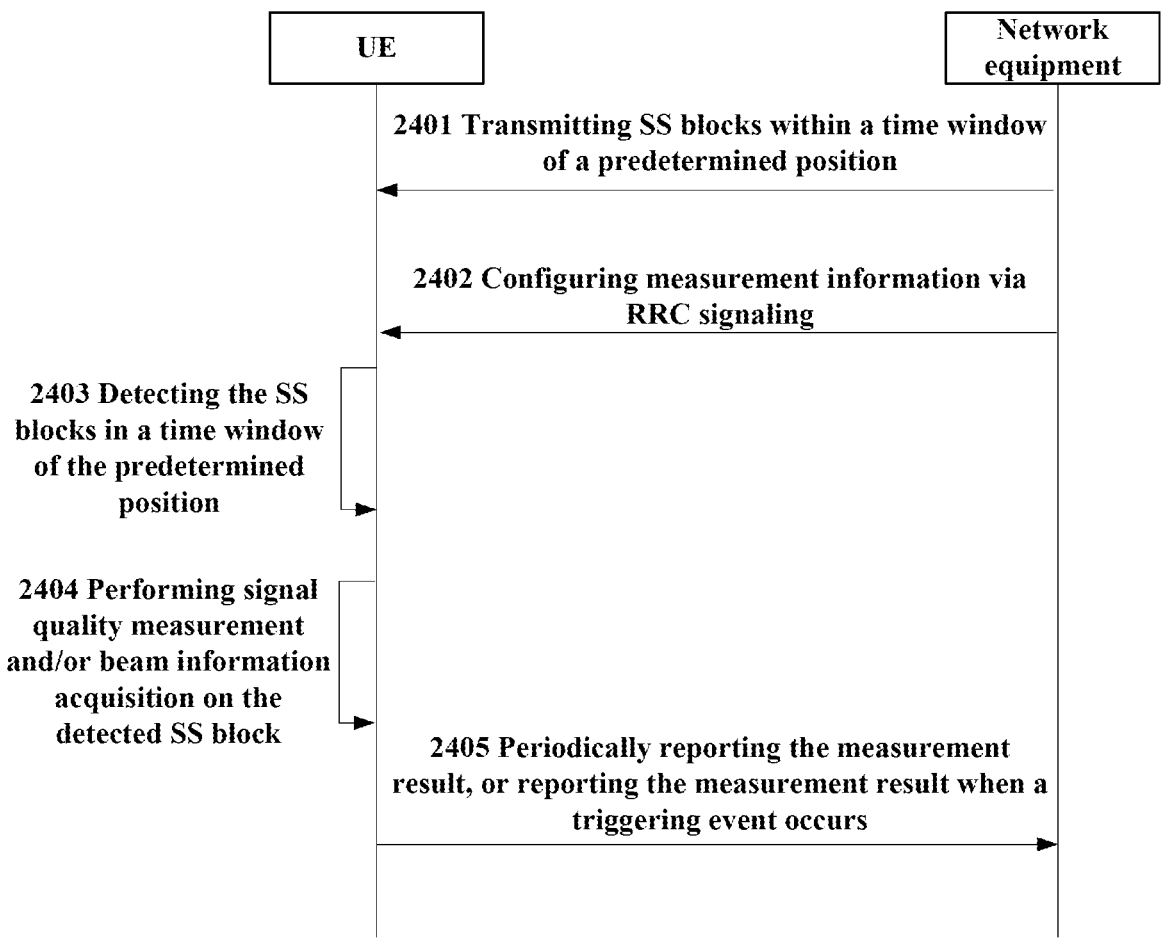
Figure 25:
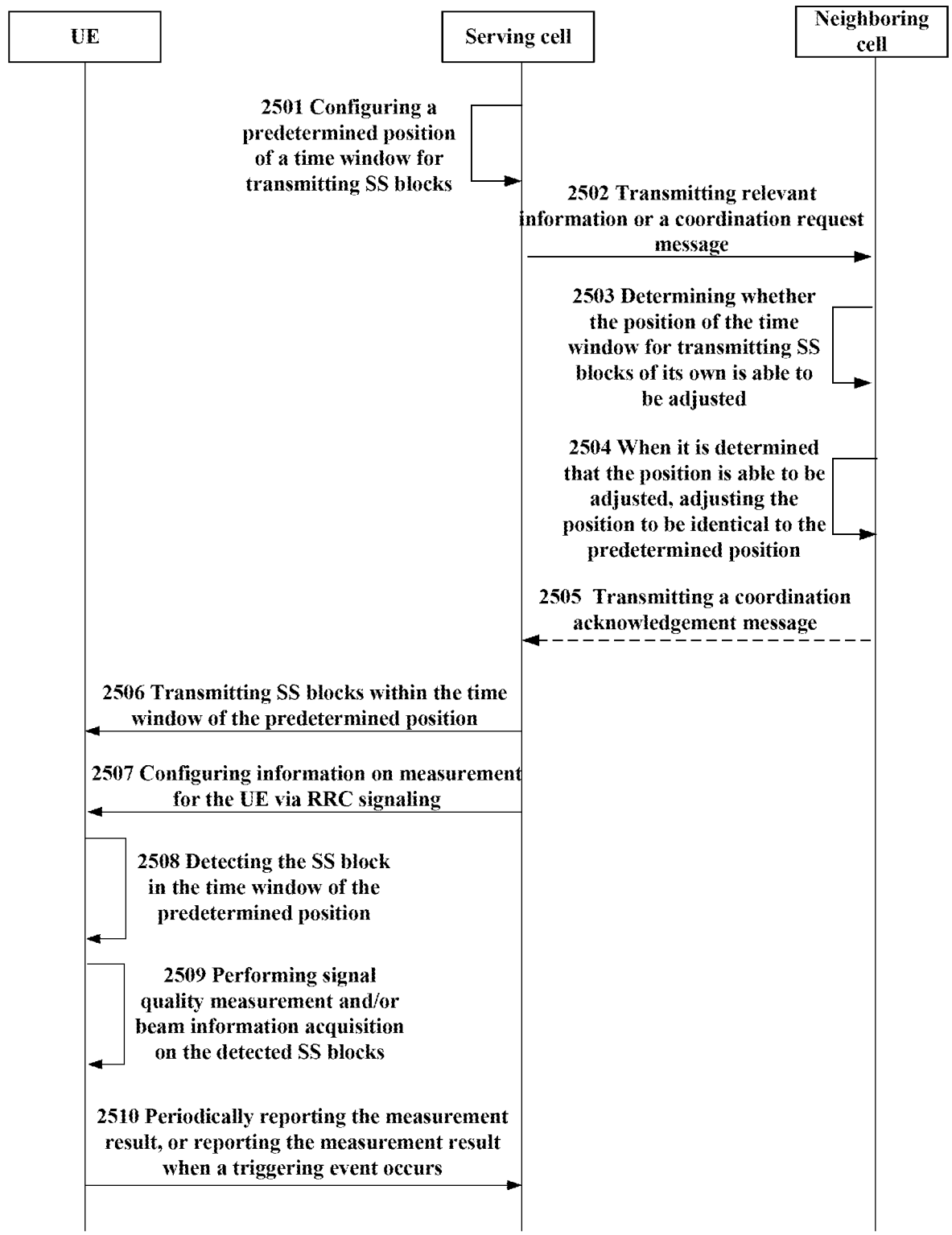

FIG. 15 is a schematic diagram of a structure of the signal transmission apparatus in Embodiment 5;

FIG. 16 is a schematic structural diagram of the signal transmission apparatus in Embodiment 6;

FIG. 17 is a schematic structural diagram of the signal transmission apparatus in Embodiment 6;

FIG. 18 is a schematic structural diagram of the signal transmission apparatus in Embodiment 7;

FIG. 19 is a schematic diagram of a structure of the network equipment in Embodiment 8;

FIG. 20 is a schematic diagram of a structure of the network equipment in Embodiment 9;

FIG. 21 is a schematic diagram of a structure of the signal detection apparatus in Embodiment 10;

FIG. 22 is a schematic diagram of a structure of the UE in Embodiment 11;

FIG. 23 is a schematic diagram of the communication system in Embodiment 12;

FIG. 24 is a flowchart of the signal transmission detection method in Embodiment 12; and FIG. 25 is a flowchart of the signal transmission detection method in Embodiment 12.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network equipment", for example, refers to equipment in a communication system that accesses terminal equipment to the communication network and provides services for the terminal equipment. The network equipment may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network equipment. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Figure 1:
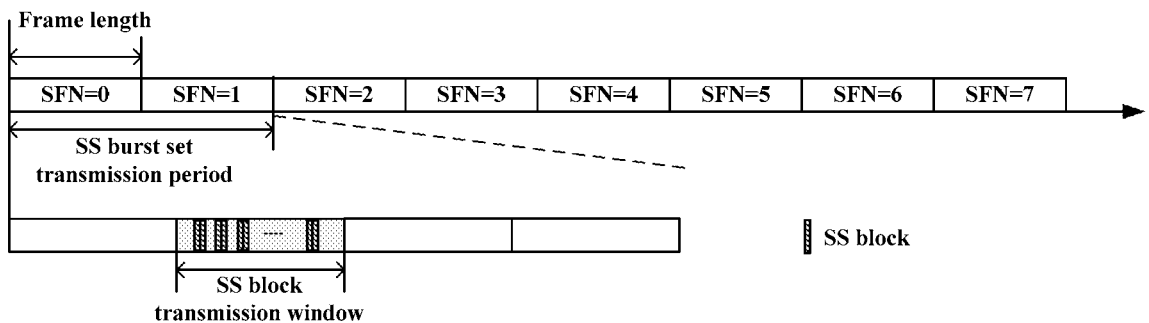

FIG. 1 is a schematic diagram of transmitting synchronization signals by a network equipment in a future wireless communication system. As shown in FIG. 1, the network equipment, for example, a base station, transmits at least one SS block by taking a synchronization signal burst set (SS burst set) transmission period as a basic period.

As shown in FIG. 1, K SS blocks may be transmitted in each synchronization signal burst set (SS burst set) transmission period; where, K is greater than or equal to 1, a single system frame length may be identical to those in other communication systems, such as 10 ms, a length of the SS burst set transmission period may be any pre-configured value, such as 5 ms, 10 ms, 20 ms, 40 ms, 80 ms, 160 ms, and the number of Ks, a length of a single system frame, a length of a signal burst set transmission period, and the like, are not limited in these embodiments.

In LTE, synchronization signals are transmitted in a distributed manner, that is, a pair of PSS and SSS is transmitted at an interval of 5 ms, while in a future wireless communication systems, such as NR, synchronization signal blocks are transmitted in a centralized manner, that is, regardless of a transmission period of an SS burst set, SS blocks contained therein are all transmitted in a time window or are limited in a certain length of time (such as 5 ms) and transmitted. For example, as shown in FIG. 1, all the SS blocks are transmitted within a time window of 5 ms after SFN=0 (SFN, system frame number).

In this way, unlike LTE, the UE may capture the synchronization signals by using search of 5 ms, and for the NR, when the UE detects SS blocks, it can only search at an SS burst set period since it is unable to determine a particular position of a time window for transmitting the SS blocks, that is, except the time window for transmitting the SS blocks, the UE is unable to detect SS blocks at other times of the SS burst set transmission period.

Furthermore, except in some cases where the network equipment notifies the UE to measure a designated cell, the UE is usually unable to know configuration information of its neighboring cells, such information on SSs. Moreover, it is difficult for a serving base station to predict which neighboring cells of the UE are, and the UE needs to detect the SSs of the neighboring cells through neighbor cell search, and then acquire such information as neighbor cell IDs and synchronization, etc.

Since the future wireless communication system supports multiple SS burst set transmission periods, such as 5 ms, 10 ms, 20 ms, 40 ms, 80 ms, 160 ms, a neighboring cell may possibly adopt an SS burst set transmission period different from that of the serving cell; as the UE is unable to know information on SSs of the neighboring cell in advance, that is, it is unable to know a particular position of the time window for transmitting the SS blocks, when the UE detects the SS blocks, it may only perform search in a maximum SS burst set period, such as 160 ms. This will result in increase in times of cell search and measurement by the UE, as well as increase in power consumption of the UE, which in turn may result in that the UE is unable to complete handover quickly, or even interruption of communication.

Usually, the network equipment configures a group of measurement parameters related to radio resource management (RRM) for the UE. For example, the parameters may include a starting position of a measurement window, a length of the measurement window, a period of the measurement window, or an SS burst set period, etc., measurement types may be divided into intra-frequency CONNECTED mode measurements, inter-frequency CONNECTED mode measurements, IDLE mode measurements. And due to the future wireless communication system supports multiple SS burst set transmission periods, a position of a time window for transmitting SS blocks needs to be designed.

In order to solve the above problem, the embodiments provide a signal transmission method, a signal detection method and apparatuses thereof and a communication system, by pre-defining a position of a time window for transmitting one or more SS blocks at a network equipment and a UE, or by configuring a position of a time window for transmitting one or more SS blocks by a network equipment, the UE is caused to perform SS block detection within the time window of the predetermined position. Hence, UE cell search and measurement time is reduced, complexity at the UE is lowered, power consumption of the UE is lowered, cell handover is sped up, communication interruption is avoided, and at least one of currently existing problems is solved.

The signal transmitting method and apparatus, the signal detection method and the apparatus in the embodiments are suitable for a scenario of a synchronization network, or a scenario in which cells in a certain area are synchronized; however, these embodiments are not limited thereto.

The embodiments of this disclosure shall be described below with reference to the accompanying drawings.

Embodiment 1

Figure 3:
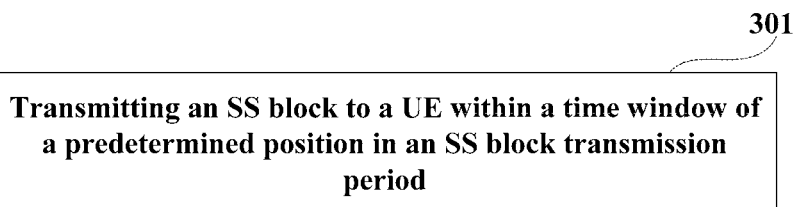

FIG. 3 is a schematic diagram of the signal transmission method in Embodiment 1, applicable to a network equipment. As shown in FIG. 3, the method includes:

step 301: a synchronization signal (SS) block is transmitted to a user equipment within a time window of a predetermined position in an SS block transmission period.

Therefore, for any synchronization signal block transmission period, the position of the time window for transmitting the SS block is predefined in a standard, that is, the network equipment and the user equipment know the transmission position of the synchronization signal block in advance, so that the UE may perform SS block detection in the time window at the predetermined position, thereby reducing cell search and measurement time of the UE, lowering the complexity of the UE in processing, lowering power consumption of the UE, speeding up cell handover, avoiding communication interruption, and solving at least one of the existing problems.

In an embodiment, the synchronization signal block transmission period may be an SS burst set transmission period, or may be a time interval of a predetermined length; one or more SS blocks form a set, and transmission is performed by taking this transmission period or time interval as a period.

In an embodiment, the synchronization signal block transmission period may be pre-configured by a network equipment. For example, a length of the synchronization signal block transmission period (SS burst set transmission period) may be of any predetermined value, such as 5 ms, 10 ms, and 20 ms, 40 ms, 80 ms, 160 ms. In an NR system, an SS burst set transmission period is set to be 20 ms by default.

In an embodiment, the time window denotes a time range, in which all SS blocks within the synchronization signal block transmission period can only be transmitted. The range is less than or equal to the synchronization signal block transmission period, or may be identical to a minimum value of the synchronization signal block transmission period. For example, when the synchronization signal block transmission period is the SS burst set transmission period, such as 5 ms, 10 ms, 20 ms, 40 ms, 80 ms, or 160 ms, all the SS blocks may be transmitted in a time window of 5 ms.

In an embodiment, the SS blocks transmitted by the network equipment by taking the synchronization signal block transmission period (for example, the SS burst set transmission period) as a period may be used to support cell synchronization, measurement, and information broadcast, etc., and the SS blocks may include a synchronization signal, and/or a broadcast channel, and/or a reference signal, etc., for example, the synchronization signals may be a primary synchronization signal (PSS/NR-PSS) and a secondary synchronization signal (SSS/NR-SSS), etc., and the broadcast channel may be a physical broadcast channel (PBCH/NR-PBCH).

Figure 2:
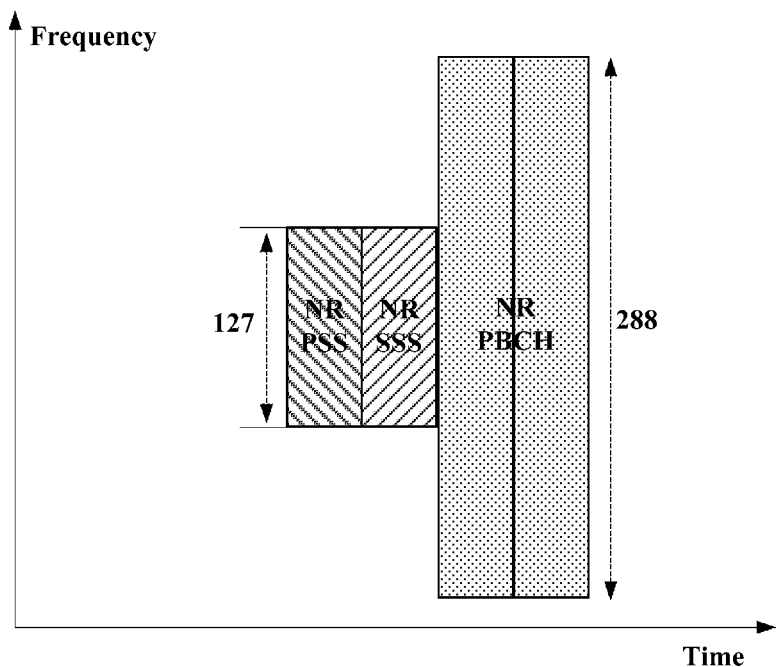

FIG. 2 is a schematic diagram of a structure of an SS block. As shown in FIG. 2, the SS block may include a PSS/NR-PSS and an SSS/NR-SSS, and furthermore, it may include two PBCH/NR-PBCH symbols. The structure of the synchronization signal block is not limited to the structure shown in FIG. 2, and it may also use other structures, such as other arrangements, or it may further include a reference signal, etc.; for example, the SS block may be constituted in an order of an NR-PSS, an NR-PBCH and an NR-SSS, NR-PBCH; however, this embodiment is not limited thereto.

In an embodiment, the number of SS blocks actually transmitted in each synchronization signal block transmission period may be determined as needed, and a determination manner is not limited. A maximum value of the number of SS blocks may be determined according to a carrier frequency. For example, when the carrier frequency is less than 3 GHz, the maximum value of the number of SS blocks is 4, when the carrier frequency is greater than or equal to 3 GHz and less than 6 GHz, the maximum value of the number of SS blocks is 8, and when the carrier frequency is greater than or equal to 6 GHz and less than 52.6 GHz, the maximum value of the number of SS blocks is 64.

In an embodiment, for different synchronization signal block transmission periods, a correspondence between the synchronization signal block transmission periods (such as SS burst set transmission periods) and the corresponding predetermined positions may be predefined, and may be stored at the network equipment and the user equipment. After a synchronization signal block transmission period is determined, when SS blocks are transmitted to the user equipment in a time window of a predetermined position within the synchronization signal block transmission period, the user equipment may determine the time window of the predetermined position according to the correspondence, and detect the SS blocks within the time window of the predetermined position. When the user equipment knows the synchronization signal block transmission period in advance, it may directly detect the SS blocks in the time window corresponding to the predetermined position of the period according to the correspondence, when the user equipment does not know the synchronization signal block transmission period, it may detect the SS blocks in time windows of corresponding predetermined positions of possible periods according to the correspondence.

In an embodiment, the position (predetermined position) of the time window in the synchronization signal block transmission period is predefined, and the predetermined position contains a starting position and an ending position of the time window in the synchronization signal block transmission period.

Predetermined positions of synchronization signal block transmission periods with identical lengths may be identical or different; for example, a predetermined position/positions of one or more time windows may be predefined, and when the number of predetermined positions is one, predetermined positions of synchronization signal block transmission periods with identical lengths are identical, such that the UE performs SS block detection within the time windows of identical predetermined positions, thereby reducing cell search and measurement time of the UE. When the number of predetermined positions is multiple, the network equipment may select a predetermined position therefrom or select the predetermined position according to a predetermined rule, and transmit SS blocks in a time window of the predetermined position. The network equipment may transmit an indication information to the UE to notify the UE of which predetermined position is used, or the UE determines which predetermined position is selected by the network equipment according to a predetermined rule, so that the UE performs SS block detection within the time window of the predetermined position, or the UE performs SS block detection within time windows of all possible predetermined positions.

When the number of carrier frequencies related to the measurement is more than one, each carrier frequency may support a predetermined number of synchronization signal block transmission periods, for a synchronization signal block transmission period of a carrier frequency, predetermined positions of the synchronization signal block transmission are identical.

In predetermined positions to which synchronization signal block transmission periods with different lengths correspond, there exists at least one common predetermined position, that is, predetermined positions of time windows for transmitting SS blocks in the synchronization signal block transmission periods with identical lengths are aligned, predetermined positions of at least one time window for transmitting SS blocks in the synchronization signal block transmission periods with different lengths are aligned, and the predetermined positions are predefined. For example, the common predetermined position may be determined according to a position of a time window for transmitting the SS blocks are transmitted in the maximum synchronization signal block transmission period, that is, there exists a time window for transmitting SS blocks in other synchronization signal block transmission periods that is aligned with the time window for transmitting the SS blocks in the maximum synchronization signal block transmission period.

When the number of carrier frequencies related to the measurement is more than one, each carrier frequency may support a predetermined number of synchronization signal block transmission periods, for synchronization signal block transmission periods with different lengths that may be supported by one carrier frequency, there exists at least one common predetermined position, that is, predetermined positions of at least one time window for transmitting SS blocks in the synchronization signal block transmission periods with different lengths are aligned, and the predetermined positions are predefined.

When the number of carrier frequencies related to the measurement is more than one, each carrier frequency may support a predetermined number of synchronization signal block transmission periods, for synchronization signal block transmission periods with different lengths that may be supported by different carrier frequencies, there exists at least one common predetermined position, that is, predetermined positions of at least one time window for transmitting SS blocks in the synchronization signal block transmission periods with different lengths of different carrier frequencies are aligned, and the predetermined positions are predefined.

For example, the common predetermined position is SFN_cw, SFN_cw=x+Sp_m·n; where x is a starting position of the synchronization signal block transmission period, x=0, 1, . . . Sp_m−1, Sp_m=Max{SS_period_i/10 ms, i=1, . . . , N}, SS_period_i is a length of a synchronization signal transmission period that can be supported by more than one carrier frequencies, N is the number of transmission periods that can be supported by more than one carrier frequencies, and n is an index of the common predetermined position.

In one embodiment, in the synchronization signal block transmission period, the starting position of the predetermined position is the starting position of the synchronization signal block transmission period, or positions spaced apart by the length of the time window after the starting position of the synchronization signal block transmission period, and the ending position of the predetermined position is a position spaced apart by the length of the time window after the starting position, that is, when the synchronization signal block transmission period is Nms and the length of the time window is Mms, the starting position of the predetermined position may be at 0 ms, Mms, 2 Mms, 3 Mms, (L) Mms, in Nms, and the ending position of the predetermined position may be at Mms, 2 Mms, 3 Mms . . . , (L+1) Mms, in Nms.

For example, when the synchronization signal block transmission period (such as the SS burst set transmission period) is 20 ms and the length of the time window is 5 ms, i.e. a half a frame length, the starting position of the predetermined position may be at 0, 5 ms, 10 ms, 15 ms, and the ending position of the predetermined position may be at 5 ms, 10 ms, 15 ms, 20 ms, that is, the predetermined position of the time window may be at 0-5 ms, 5 ms-10 ms, 10 ms-15 ms or 15 ms-20 ms.

However, this embodiment is not limited thereto, the starting position of the predetermined position may also be a position spaced apart by the length of the time window after an arbitrary position in the synchronization signal block transmission period, for example, the arbitrary position is at Pms, and the starting position of the predetermined position may be at Pms, P+Mms, P+2 Mms, and P+3 Mms, etc., in Nms, and the ending position of the predetermined position may be at P+Mms, P+2 Mms, and P+3 Mms, etc., in Nms, which shall not be enumerated herein any further.

In one embodiment, within the synchronization signal block transmission period, the predetermined position is a front position or a rear position of each frame in the synchronization signal block, for example, it may be a former half of a frame or a latter half of a frame; for example, the frame may be a starting frame, or may be another frame than the starting frame.

For example, when the length of the time window is 5 ms and the transmission period is greater than the length of the time window, for example, the transmission period is 10 ms, 20 ms, 40 ms, 80 ms, or 160 ms, the predetermined position may be a former half of each frame or a latter half of the frame in 10 ms, 20 ms, 40 ms, 80 ms, or 160 ms, that is, when the transmission period is 10 ms, the predetermined position may be the former half of the frame or the latter half of the frame, when the transmission period is 20 ms, the number of the predetermined positions may be 4, which are located respectively in a former half of each frame or a latter half of the frame, when the transmission period is 40 ms, the number of the predetermined positions may be 8, which are located respectively in a former half of each frame or a latter half of the frame, when the transmission period is 80 ms, the number of the predetermined positions may be 16, which are located respectively in a former half of each frame or a latter half of the frame, when the transmission period is 160 ms, the number of the predetermined positions may be 32, which are located respectively in a former half of each frame or a latter half of the frame. The above are possible candidate positions of the predetermined positions, and the predetermined position may be one or more of the above candidate positions. Likewise, for a common predetermined position of different synchronization signal block transmission periods, it may be located in one or more of the above candidate positions.

When the transmission period is 10 ms, 20 ms, 40 ms, 80 ms, or 160 ms, the number of the predetermined position may be 1, i.e., a former half 0 ms-5 ms of a starting frame or a latter half 5 ms-10 ms of the frame; however, this embodiment is not limited thereto, and the starting position of the predetermined position may also be a position after the starting frame spaced apart by Pms, and the ending position may be a position of Pms plus the length of the time window, that is, when P=1, the predetermined position may be 1 ms-6 ms, etc., which shall not be enumerated herein any further. The predetermined position is illustrated above by taking the staring frame as an example only, and implementations of predetermined positions of other frames are identical to that of the staring frame, which shall not be described herein any further.

When the transmission period is identical to the length of the time window, the predetermined position is identical to the transmission period.

In an embodiment, when there exists a system frame number (SFN) deviation between the serving cell and a neighboring cell, in order that the time windows for transmitting the SS blocks between cells are aligned, the method may further include (not shown in figures): pre-defining the predetermined position according to the system frame number deviation, that is, when the predetermined position is predefined, a factor of the SFN deviation needs to be taken into account, and the SFN deviation may be corrected (compensated) by the predetermined position, so as to ensure that the time windows for transmitting the SS blocks between the cells are aligned.

For example, the predetermined position is SFN_cw, SFN_cw=x+Sp_m·n+$\Delta$; where $\Delta$ denotes the SFN deviation; and furthermore, definitions of x, Sp_m, SS_period_i, N and n are identical to those described above, which shall be described herein any further.

The predetermined position shall be described below by taking that the synchronization signal block transmission periods are SS burst set transmission periods, which may particularly be 5 ms, 10 ms, 20 ms, 40 ms, 80 ms, or 160 ms, as examples.

Figure 4A:
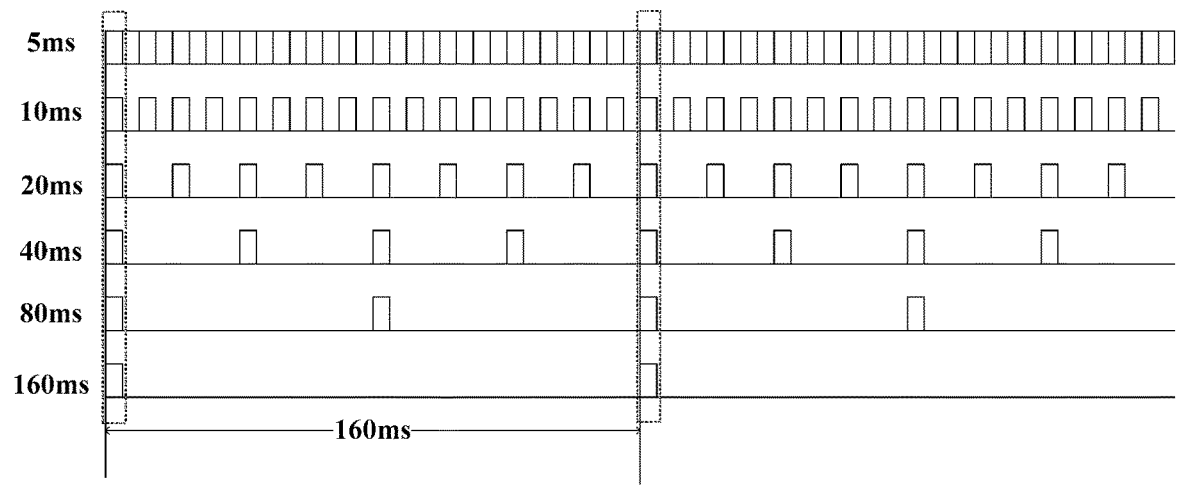
Figure 4B:
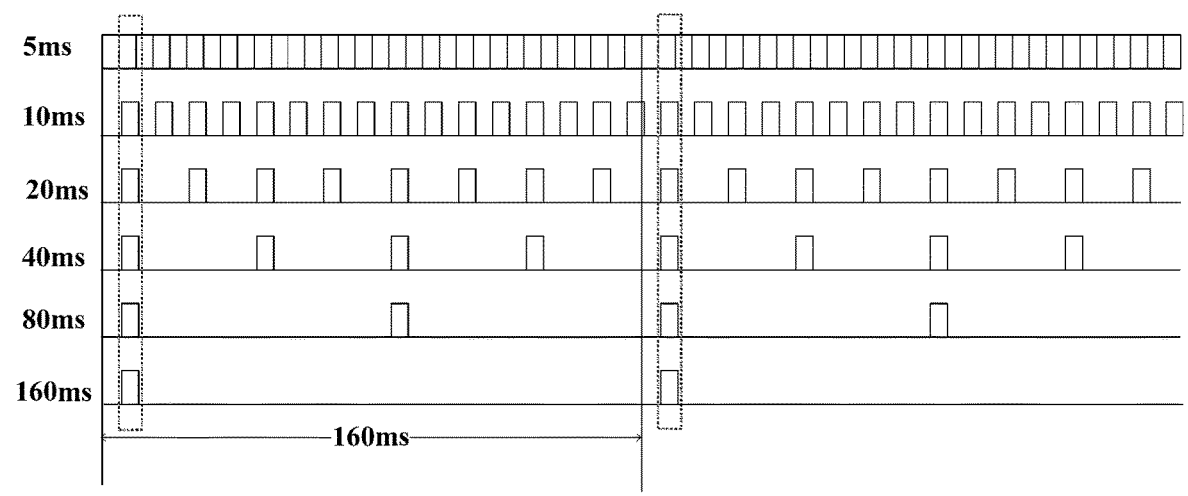

FIG. 4A and FIG. 4B are schematic diagrams of the common predetermined position in different SS burst set transmission periods in an embodiment. For transmission periods with different lengths, there exists a time window of the common predetermined position. As shown by the dotted line frame in FIG. 4A, the predetermined position is a former half of a starting frame in the SS burst set transmission period. As shown by the dotted line frame in FIG. 4B, the predetermined position is a latter half of the starting frame in the SS burst set transmission period. What described above is illustrative only, and this embodiment is not limited thereto, which shall not be enumerated herein any further.

With these embodiments, for any synchronization signal block transmission periods, the position of the time window for transmitting the SS blocks is pre-defined, so that the UE performs SS block detection in the time window of the predetermined position. Hence, cell search and measurement time by the UE is reduced, complexity at the UE is lowered, power consumption of the UE is lowered, cell handover is sped up, communication interruption is avoided, and at least one of currently existing problems is solved.

Embodiment 2

When synchronization signal block transmission periods (SS burst set transmission periods) of respective cells may be exchanged between base stations of the cells, when the base stations configure measurement information for a UE, the measurement information may include: a cell list, a length of a measurement window, a period of the measurement window, and/or the SS burst set transmission period, etc. If positions of time windows for transmitting SS blocks between the cells are unable to be coordinated with each other and are unable to be flexibly changed, it will result in that only a very small amount of neighboring cells be measured within the configured measurement window, and effective cell measurement is unable to be performed.

Therefore, Embodiment 2 provides a signal transmission method, applicable to a network equipment (a network equipment of a serving cell), with a difference from the signal transmission method in Embodiment 1 being that, in Embodiment 1, the predetermined position is pre-defined in a standard, and in Embodiment 2, the predetermined position may be configured by a network equipment, parts identical to those in Embodiment 1 being not going to be described herein any further, and different parts shall be described below in detail.

Figure 5A:
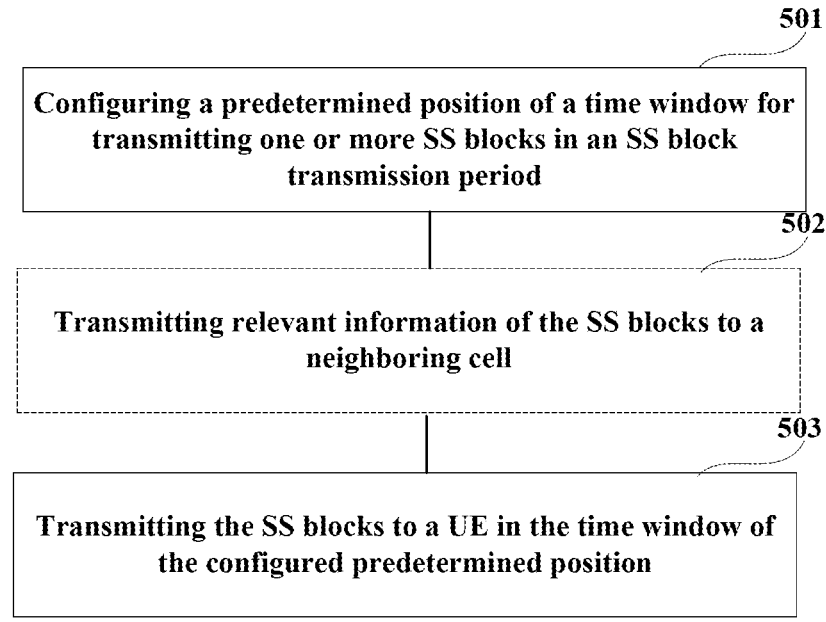

FIG. 5A is a flowchart of the signal transmission method in Embodiment 2, which is applicable to a network equipment. As shown in FIG. 5A, the method includes:
step 501: a predetermined position of a time window for transmitting one or more synchronization signal blocks (SS blocks) is configured in a synchronization signal block transmission period; and
step 503: the synchronization signal blocks (SS blocks) is transmitted to a user equipment in the time window of the configured predetermined position.

With the embodiments, for any synchronization signal block transmission periods, the position of the time window for transmitting the SS blocks is configured by the network equipment, so that the UE performs SS block detection in the time window of the predetermined position. Hence, flexibility of transmission of the SS blocks is increased, cell search and measurement time by the UE is reduced, complexity at the UE is lowered, power consumption of the UE is lowered, cell handover is sped up, communication interruption is avoided, and at least one of currently existing problems is solved.

In an embodiment, since the network equipment (such as a base station) may configure the predetermined position, in order to achieve synchronization coordination of the cells and facilitate measurement of the neighboring cells, the base station of the serving cell needs to notify the configured predetermined position to base stations of its neighboring cells, that is, after step 501, the method further includes:
step 502: relevant information of the SS blocks is transmitted to a neighboring cell, the information including the predetermined position.

In an embodiment, the relevant information may further include: a cell identifier (ID), a synchronization signal block (SS block) transmission period of a cell (i.e. an SS burst set transmission period), and a common predetermined position; however, this embodiment is not limited thereto. A meaning of the common predetermined position is identical to that in Embodiment 1, which shall not be described herein any further.

In an embodiment, step 502 may be executed after step 503; however, this embodiment is not limited thereto.

In an embodiment, when there exists a system frame number (SFN) deviation between the serving cell and a neighboring cell, in order that the time windows for transmitting the SS blocks between the cells are aligned, the method may further include (not shown in figures): configuring the predetermined position according to the system frame number deviation, that is, when the predetermined position is configured, a factor of the SFN deviation needs to be taken into account, and the SFN deviation may be corrected (compensated) by the predetermined position, so as to ensure that the time windows for transmitting the SS blocks between the cells are aligned.

In an embodiment, after the neighboring cell receive the relevant information, positions of time windows for transmitting SS blocks of the neighboring cell may be adjusted; when there exists an SFN deviation between the cells, in adjusting the positions of the time windows to a predetermined position, the SFN deviation may be corrected (compensated), so as to ensure that the time windows for transmitting the SS blocks between the cells are aligned. Hence, the positions of time windows for transmitting SS blocks of the cells may be coordinated, which may be taken as a reference of RRM measurement configuration of the base station, reducing cell search and measurement time of the UE, lowering the complexity of the UE in processing, lowering power consumption of the UE, speeding up cell handover, avoiding communication interruption, and solving at least one of the existing problems.

Figure 5B:
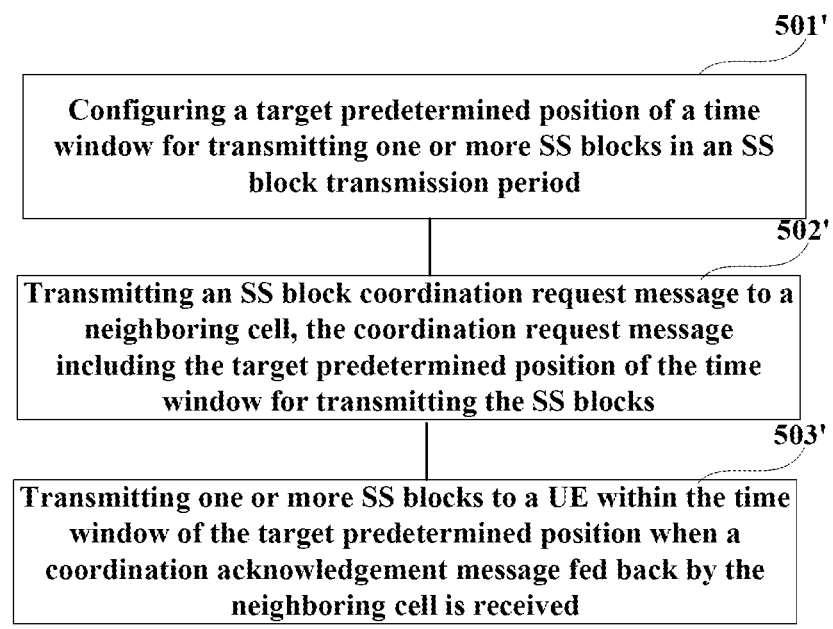

FIG. 5B is a flowchart of the signal transmission method in Embodiment 2, which is applicable to a network equipment. As shown in FIG. 5B, the method includes:

step 501': a target predetermined position of a time window for transmitting one or more synchronization signal blocks (SS blocks) is configured in a synchronization signal block transmission period;

step 502': an SS block coordination request message is transmitted to a neighboring cell, the coordination request message including the target predetermined position of the time window for transmitting the synchronization signal blocks; and step 503': synchronization signal blocks (SS blocks) are transmitted to a user equipment within the time window of the target predetermined position when a coordination acknowledgement message fed back by the neighboring cell is received.

Thus, when the neighboring cell transmit the coordination acknowledgement message, it shows that the neighboring cell has adjusted respective time windows for transmitting the synchronization signal blocks to the target predetermined position, and a base station of the serving cell may correspondingly perform measurement configuration on a UE of an own cell according to the coordinated time windows for transmitting the synchronization signal blocks.

With these embodiments, for any synchronization signal block transmission period, the network equipment transmits the position of the time window for transmitting the synchronization signal blocks, so that the UE performs SS block detection within the time window of the predetermined position. Hence, flexibility of transmission of the SS blocks is increased, cell search and measurement time by the UE is reduced, complexity at the UE is lowered, power consumption of the UE is lowered, cell handover is sped up, communication interruption is avoided, and at least one of currently existing problems is solved.

In an embodiment, when there exists a system frame number (SFN) deviation between the serving cell and a neighboring cell, a configuration manner of the predetermined position is that described above, which shall not be described herein any further.

In an embodiment, the coordination request message may further include a cell ID, and a synchronization signal block (SS block) transmission period of a cell, etc., and this embodiment is not limited thereto.

In step 502', when the coordination acknowledgement message fed back by the neighboring cell is not received, or a coordination rejection message fed back by the neighboring cell is received, it indicates that the neighboring cell cannot be coordinated for some reasons, such as services of the own cell, and according to such parameters as an original time window of the neighboring cell for transmitting SS blocks, and a period, etc., the base station of the serving cell configures the measurement of the neighboring cell performed by the UE of the own cell.

In an embodiment, the signal transmission method of FIG. 5A and FIG. 5B may further include (not shown in figures): transmitting configuration information to the UE, the configuration information including the predetermined position, so that the UE performs SS block detection in the time window of the predetermined position.

In an embodiment, the synchronization signal block transmission periods and frequencies of the serving cell and the neighboring cell may be identical or different.

The signal transmission method in Embodiment 2 shall be described below for different scenarios by taking that the synchronization signal block transmission periods are the SS burst set transmission periods as an example.

Figure 6A:
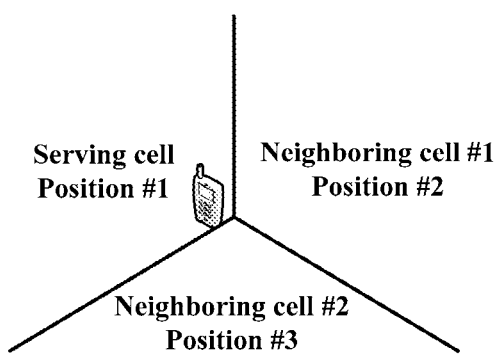
Figure 6A:
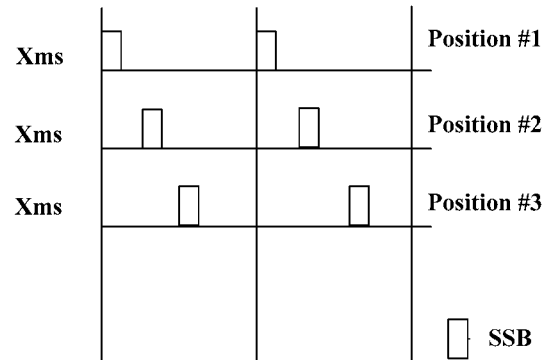
Figure 6B:
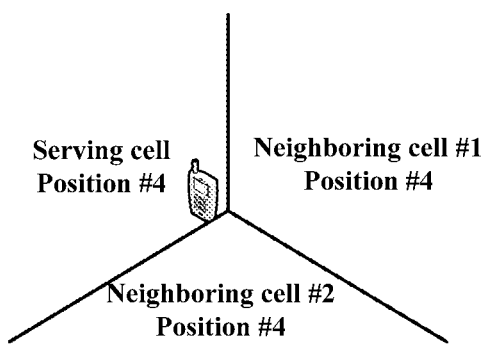
Figure 6B:
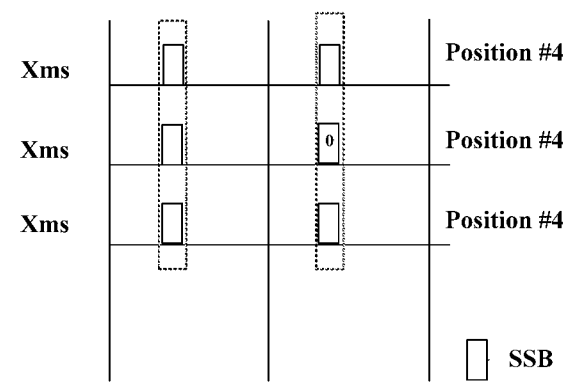

1) FIG. 6A is a schematic diagram of a signal detection time window in the relevant art, and FIG. 6B is a schematic diagram of a signal detection time window in Embodiment 2. In a scenario of intra-frequency cell networking in FIG. 6A and FIG. 6B, SS burst set periods of neighboring cells and a serving cell are identical, that is, base stations of the cells adopt identical SS burst set transmission periods, which are all Xms (X is greater than 5, such as 10, 20, 40, 80, or 160).

In the relevant art in FIG. 6A, a position of a time window of SS blocks of the serving cell is at position #1, a position of a time window of SS blocks of a neighboring cell 1 is at position #2, and a position of a time window of SS blocks of a neighboring cell 2 is at position #3; if the serving cell needs to adjust the position of the time window of the SS blocks to position #4 (dotted line frame), it may notify neighboring cells 1 and 2 of the configured position. As shown in FIG. 6B. neighboring cell 1 adjusts the position of the time window of SS block of its own from position #2 to position #4 according to position #4, and neighboring cell 2 adjusts the position of the time window of SS block of its own from position #3 to position #4 according to position #4, so as to achieve coordination between the cells.

Figure 7A:
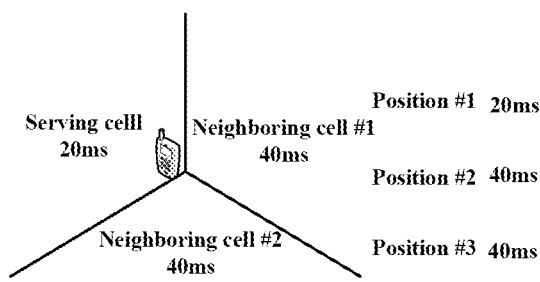
Figure 7A:
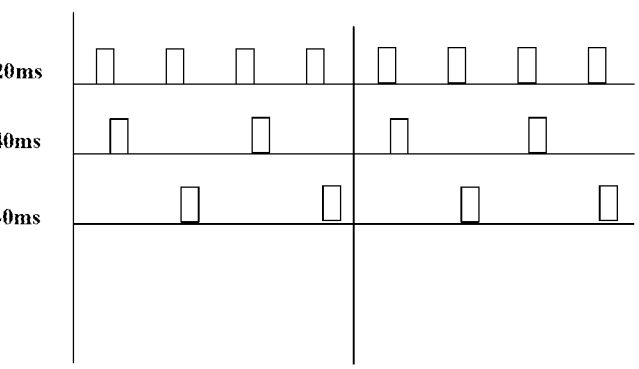
Figure 7B:
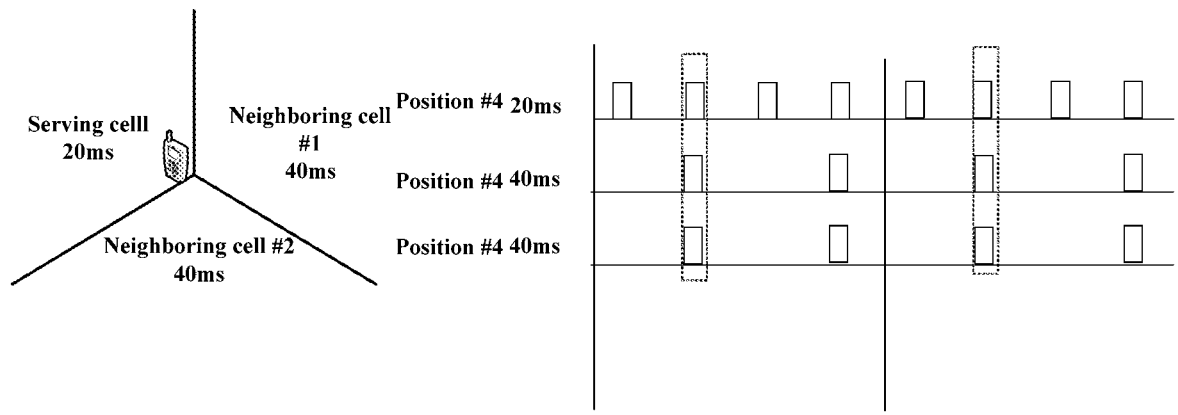

2) FIG. 7A is a schematic diagram of a signal detection time window in the relevant art, and FIG. 7B is a schematic diagram of a signal detection time window in Embodiment 2. In a scenario in FIG. 7A and FIG. 7B, SS burst set periods of a serving cell and neighboring cells are different, which are 20 ms, 40 ms, and 40 ms, respectively.

In the relevant art in FIG. 7A, positions of time window for transmitting SS blocks of the serving cell, neighboring cell 1 and neighboring cell 2 are different. As shown in FIG. 7B, if the serving cell needs to adjust the position of the time window of the SS blocks to position #4 (dotted line frame), it may notify neighboring cells 1 and 2 of the configured position. Neighboring cell 1 adjusts the position of the time window of SS block of its own from position #2 to position #4 according to position #4, and neighboring cell 2 adjusts the position of the time window of SS block of its own from position #3 to position #4 according to position #4, so as to achieve coordination between the cells.

Figure 8A:
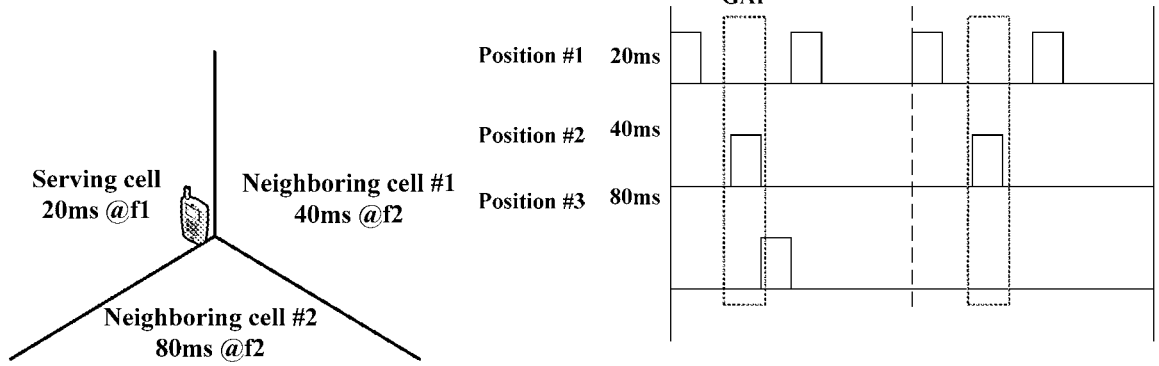
Figure 8B:
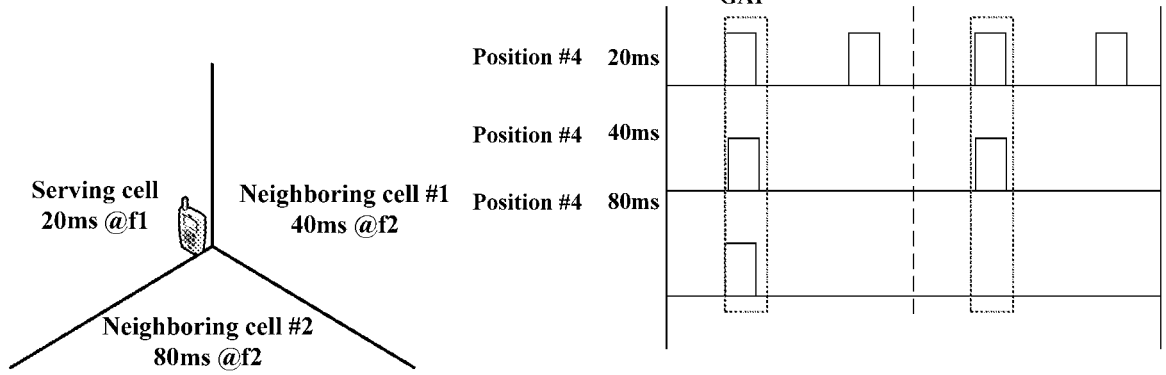

3) FIG. 8A is a schematic diagram of a signal detection time window in the relevant art, and FIG. 8B is a schematic diagram of a signal detection time window in Embodiment 2. In a scenario in FIG. 8A and FIG. 8B, SS burst set periods of neighboring cells are different, which are 20 ms, 40 ms, and 80 ms, respectively, and frequencies thereof are also different.

In the relevant art in FIG. 8A, for inter-frequency measurement, a GAP needs to be configured, and positions of time windows for transmitting SS blocks of the serving cell, neighboring cell 1 and neighboring cell 2 are different. As shown in FIG. 8B, if the serving cell needs to adjust the position of the time window of the SS blocks to position #4 (dotted line frame), it may notify neighboring cells 1 and 2 of the configured position. Neighboring cell 1 adjusts the position of the time window of SS block of its own from position #2 to position #4 according to position #4, and neighboring cell 2 adjusts the position of the time window of SS block of its own from position #3 to position #4 according to position #4, so as to achieve coordination between the cells.

The predetermined position is described above with reference to the accompanying drawings by taking 20 ms, 40 ms and 80 ms as examples; however, this embodiment is not limited thereto.

With these embodiments, for any synchronization signal block transmission periods, the position of the time window for transmitting the SS blocks is configured by the network equipment, so that the UE performs SS block detection in the time window of the predetermined position. Hence, flexibility of transmission of the SS blocks is increased, cell search and measurement time by the UE is reduced, complexity at the UE is lowered, power consumption of the UE is lowered, cell handover is sped up, communication interruption is avoided, and at least one of currently existing problems is solved.

Embodiment 3

Embodiment 3 provides a signal transmission method, which applicable to a network equipment (a network equipment of neighboring cells), and corresponds to Embodiment 2, with repeated parts being not going to be described herein any further.

Figure 9:
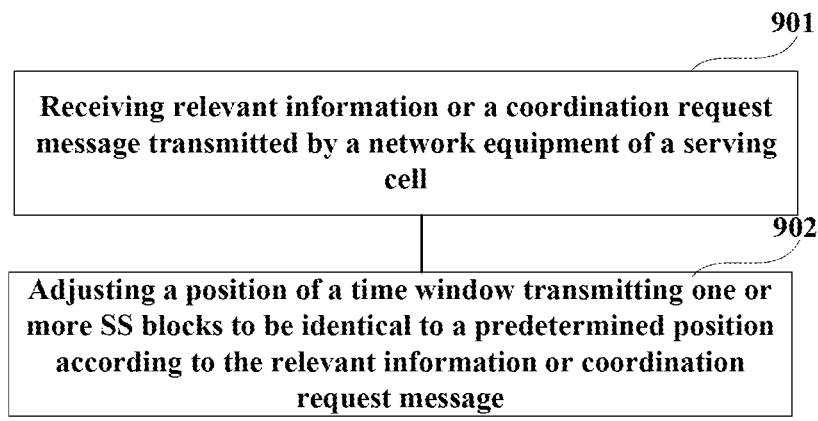

FIG. 9 is a flowchart of the signal transmission method in this embodiment. As shown in FIG. 9, the method includes:
  step 901: relevant information or a coordination request message which is transmitted by a network equipment of a serving cell is received.

In an embodiment, reference may be made to Embodiment 2 for a particular implementation of the relevant information or the coordination request message, which shall not be described herein any further.
  step 902: a position of a time window transmitting one or more SS blocks is adjusted to be identical to a predetermined position according to the relevant information or the coordination request message.

When there exists an SFN deviation between cells, as the SFN deviation is taken into account in configuring the predetermined position, when the position of the time window is adjusted to the predetermined position, the SFN deviation may be corrected (compensated), so as to ensure that time windows transmitting SS blocks between cells are aligned.

In an embodiment, when it is determined according to the coordination request message that the position of the time window transmitting SS blocks may be adjusted, the method may further include (not shown in figures): feeding back a coordination acknowledgement message to the network equipment of the serving cell.

In an embodiment, when it is determined according to the coordination request message that the position of the time window transmitting SS blocks may not be adjusted, the method may further include (not shown in figures): feeding back a coordination rejection message to the network equipment of the serving cell, or not transmitting any message.

With these embodiments, for any synchronization signal block transmission periods, the position of the time window for transmitting the SS blocks is configured by the network equipment, so that the UE performs SS block detection in the time window of the predetermined position. Hence, flexibility of transmission of the SS blocks is increased, cell search and measurement time by the UE is reduced, complexity at the UE is lowered, power consumption of the UE is lowered, cell handover is sped up, communication interruption is avoided, and at least one of currently existing problems is solved.

Embodiment 4

Embodiment 4 provides a signal detection method, which applicable to a UE.

Figure 10:
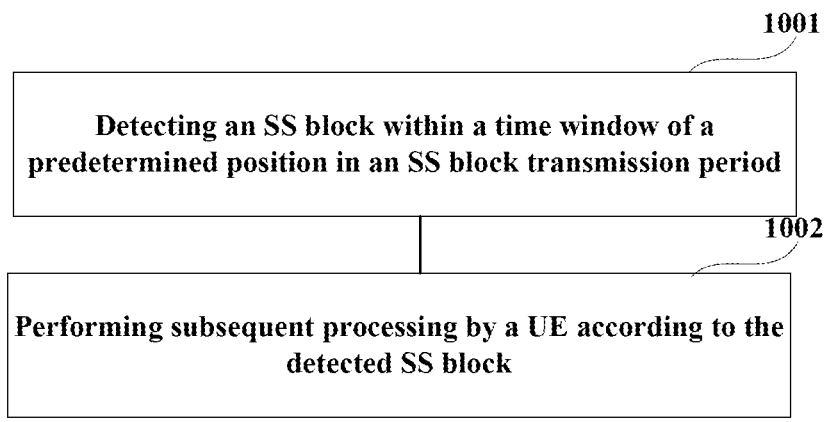

FIG. 10 is a flowchart of the signal detection method in Embodiment 4. As shown in FIG. 10, the method includes:
  step 1001: a synchronization signal (SS) block is detected within a time window of a predetermined position in an SS block transmission period.

With the embodiments, for any synchronization signal block transmission periods, the position of the time window for transmitting the SS blocks is predefined, so that the UE performs SS block detection in the time window of the predetermined position. Hence, cell search and measurement time by the UE is reduced, complexity at the UE is lowered, power consumption of the UE is lowered, cell handover is sped up, communication interruption is avoided, and at least one of currently existing problems is solved.

Reference may be made to Embodiment 1 or 2 for a particular manner for defining the predetermined position, which shall not be described herein any further.

In an embodiment, for different synchronization signal block transmission periods, a correspondence between the synchronization signal block transmission periods (such as SS burst set transmission periods) and corresponding predetermined positions may be predefined, and stored at a network equipment and a user equipment. After determining a synchronization signal block transmission period, when SS blocks are transmitted to the user equipment in a time window of a predetermined position within the synchronization signal block transmission period, the user equipment may determine a time window of the predetermined position according to the correspondence, and detect the SS blocks within the time window of the predetermined position. When the user equipment knows the synchronization signal block transmission period in advance, the user equipment may directly detect the SS blocks in the time window of the predetermined position corresponding to the period according to the correspondence; and when the user equipment does not know the synchronization signal block transmission period, the user equipment may detect the SS blocks in a time window of a corresponding predetermined position of possible periods according to the correspondence.

In an embodiment, after the SS block detection is completed, the method further includes:

step 1002: the UE performs subsequent processing according to the detected SS blocks.

For example, after detecting the synchronization signals in the time window of the predetermined position, the UE may further perform measurement of signal quality and beam quality of the neighboring cells. Reference may be made to the relevant art for a particular implementation of step 1002. For example, if accuracy of the measurement is taken into account, a more accurate measurement value may be obtained by combining multiple times of measurements, and a periodic report or an event-triggered measurement report may be performed according to measurement information configured by the serving cell. And if a better neighboring cell satisfying requirements is found, the network equipment initiates a handover procedure to assist handover of the UE to a neighboring cell of better signal quality. The neighboring cells may be of intra-frequency or inter-frequency.

In an embodiment, when the predetermined position is configured by the network equipment, before the step 1001, the method may further include: receiving configuration information transmitted by the network equipment, the configuration information including the predetermined position, so that the UE performs SS block detection in the time window of the predetermined position.

The signal detection method in Embodiment 4 shall be described below for different scenarios by taking that the synchronization signal block transmission periods are the SS burst set transmission periods as an example.

Figure 11A:
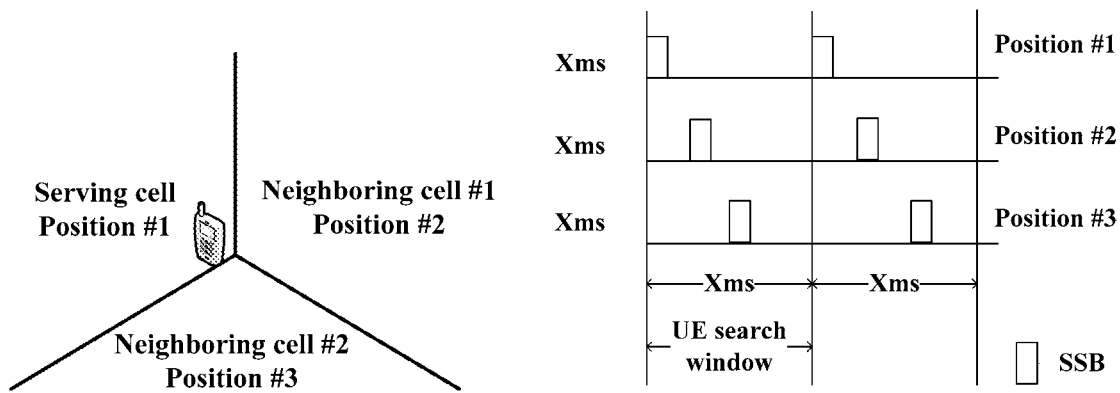
Figure 11B:
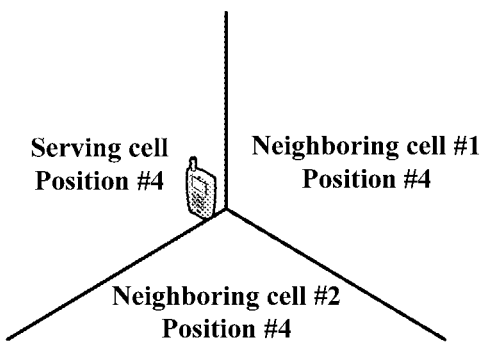
Figure 11B:
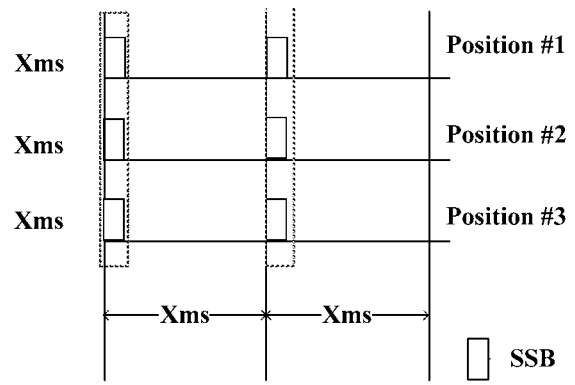

1) FIG. 11A is a schematic diagram of a signal detection time window in the relevant art, and FIG. 11B is a schematic diagram of a signal detection time window in Embodiment 4. In a scenario of intra-frequency cell networking in FIG. 11A and FIG. 11B, it is assumed that SS burst set periods of neighboring cells and a serving cell are identical, that is, base stations of the cells adopt identical SS burst set transmission periods, which are all Xms (X is greater than 5, such as 10, 20, 40).

In the relevant art in FIG. 11A, a position of a time window of SS blocks of the serving cell is at position #1, a position of a time window of SS blocks of a neighboring cell 1 is at position #2, and a position of a time window of SS blocks of a neighboring cell 2 is at position #3. As a position of a time window for transmitting the SS blocks is not predefined, the UE is unable to determine a possible position of a time window for transmitting the SS blocks in advance, and can only adopt a search window of a length of Xms, and even if positions of #1, #2 and #3 are identical, the UE is unable to know in advance; and as a length of a time window for transmitting SS blocks in an NR system is 5 ms, a search time of the UE is increased.

As shown in FIG. 11B, in an embodiment, predetermined positions of time window of the same transmission period are identical, which are all at #4 (dotted line frame). Hence, the UE may adopt a search window of a length of 5 ms, and perform search in a time window of a predetermined position #4, which may reduce time of search, and solve currently existing problems. Reference may be made to Embodiment 1 or 2 for a particular manner for defining predetermined position #4, which shall not be described herein any further.

Figure 12A:
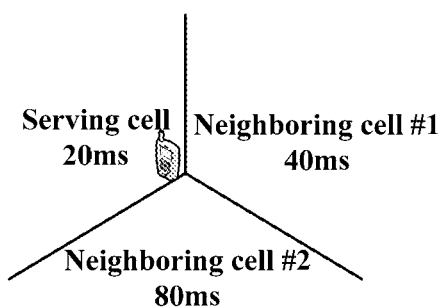
Figure 12A:
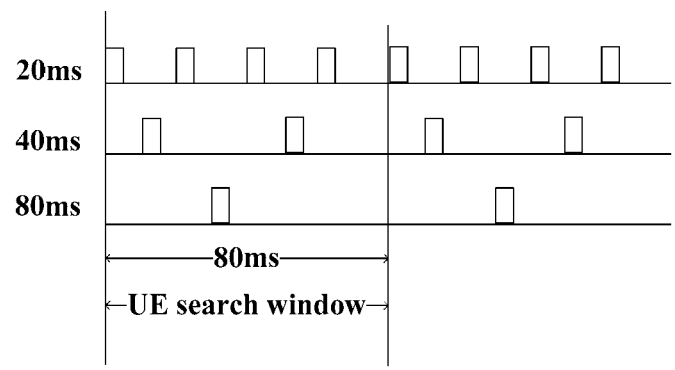
Figure 12B:
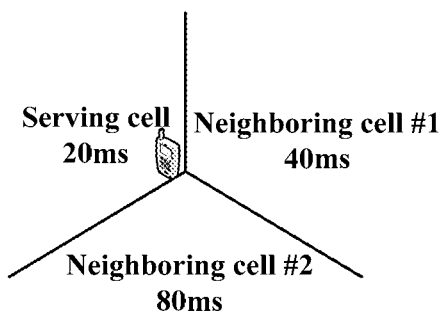
Figure 12B:
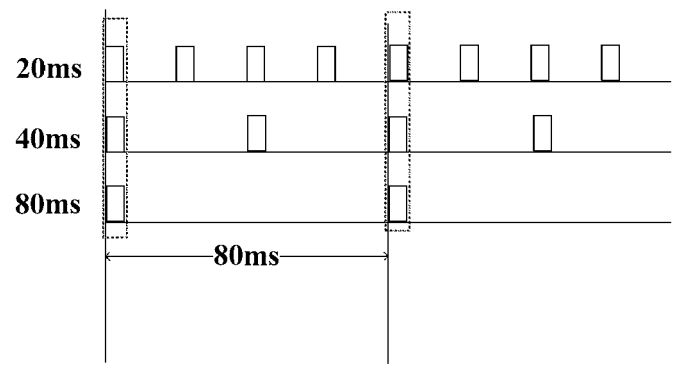

2) FIG. 12A is a schematic diagram of a signal detection time window in the relevant art, and FIG. 12B is a schematic diagram of a signal detection time window in Embodiment 4. In a scenario in FIG. 12A and FIG. 12B, SS burst set periods of neighboring cells are different, which are 20 ms, 40 ms, 80 ms, respectively.

In the relevant art in FIG. 12A, positions of time windows for transmitting SS blocks of neighboring cell 1 and neighboring cell 2 are different. As a position of a time window for transmitting the SS blocks is not predefined, in a case where the network equipment is unable to definitely configure the UE with relevant information of synchronization signals of its neighboring cells, the UE is unable to determine a possible position of a time window for transmitting the SS blocks in advance, and can only adopt a search window of a maximum length of 80 ms, which will increase a search time of the UE. It should be noted that it is assumed here that a maximum possible SS burst set period is 80 ms, and if a maximum possible SS burst set period is 160 ms, the UE can only perform cell search according to a search window of 160 ms, even if cells around the UE adopt a maximum period of 80 ms.

As shown in FIG. 12B, in an embodiment, different transmission periods have time windows of a common predetermined position. Hence, the UE may adopt a search window of 5 ms to perform search within the time window of the predetermined position, which may reduce time of search, and solve currently existing problems. Reference may be made to Embodiment 1 or 2 for a particular manner for defining the predetermined position, which shall not be described herein any further.

Figure 13A:
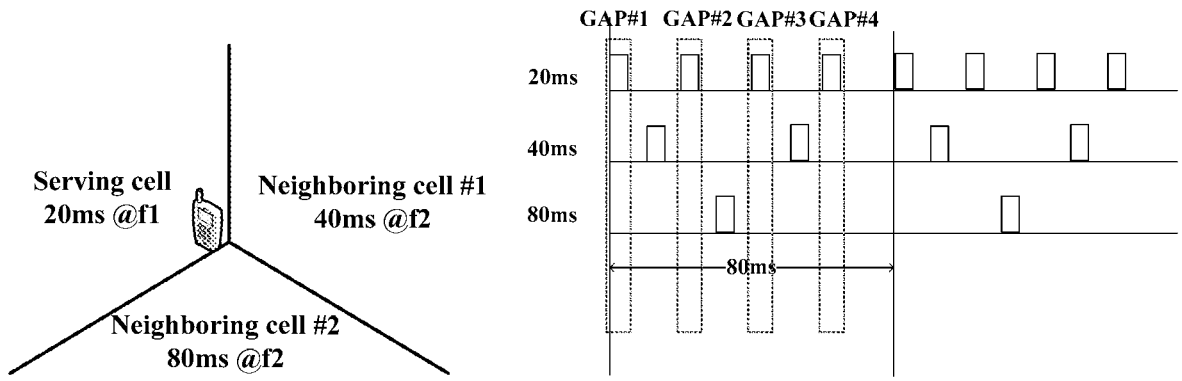
Figure 13B:
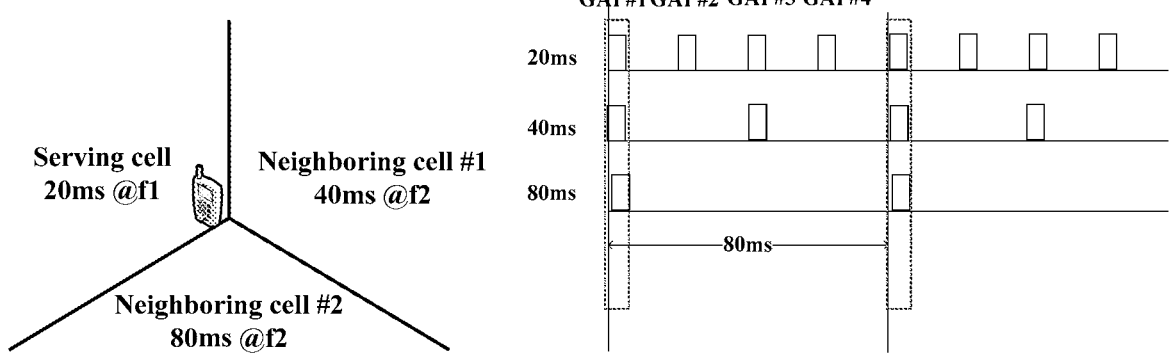

3) FIG. 13A is a schematic diagram of a signal detection time window in the relevant art, and FIG. 13B is a schematic diagram of a signal detection time window in Embodiment 4. In a scenario in FIG. 13A and FIG. 13B, SS burst set periods of neighboring cells are different, which are 20 ms, 40 ms, 80 ms, respectively, and frequencies thereof are also different.

In the relevant art in FIG. 13A, for inter-frequency measurement, a GAP needs to be configured, and positions of time windows for transmitting SS blocks of the serving cell, neighboring cell 1 and neighboring cell 2 are different. As a position of a time window for transmitting the SS blocks is not predefined, the UE is unable to determine positions of time windows for transmitting the SS blocks of the neighboring cells, and the UE is unable to be made to perform reliable cell search and measurement based on a GAP length of 6 ms in LTE systems, and can only adopt a search window of a maximum length of 80 ms, which will increase a search time of the UE. It should be noted that it is assumed here that a maximum possible SS burst set period is 80 ms, and if a maximum possible SS burst set period is 160 ms, the UE can only perform cell search according to a search window of 160 ms, even if cells around the UE adopt a maximum period of 80 ms.

As shown in FIG. 13B, in an embodiment, different transmission periods have time windows of a common predetermined position, and a GAP length of approximate 5 ms to 6 ms may be configured for the UE, and the UE may perform cell search and measurement quickly. Hence, UE cell search and measurement time is reduced, complexity at the UE is lowered, power consumption of the UE is lowered, cell handover is sped up, communication interruption is avoided, and at least one of currently existing problems is solved. Reference may be made to Embodiment 1 or 2 for a particular manner for defining the predetermined position, which shall not be described herein any further.

Figure 14A:
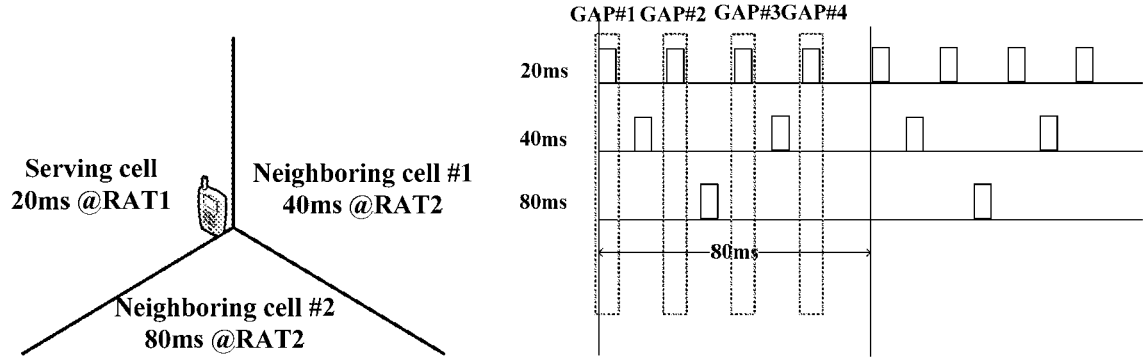
Figure 14B:
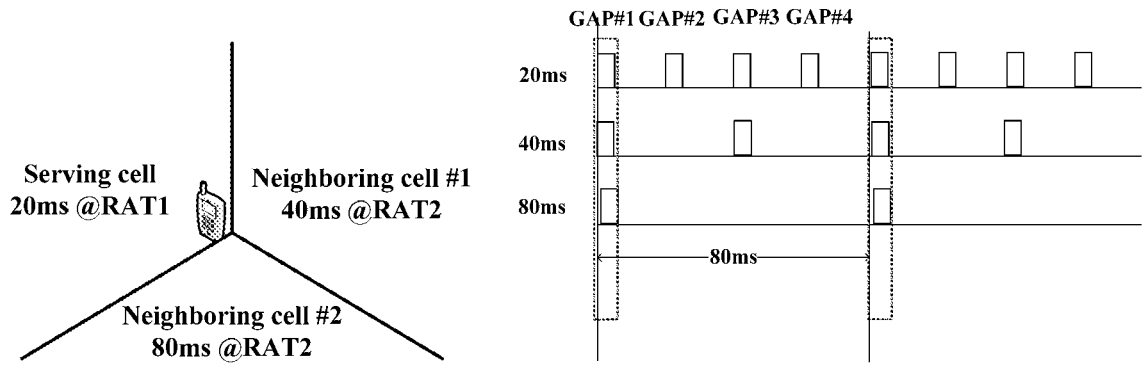

4) FIG. 14A is a schematic diagram of a signal detection time window in the relevant art, and FIG. 14B is a schematic diagram of a signal detection time window in Embodiment 4. In a scenario in FIG. 14A and FIG. 14B, SS burst set periods of neighboring cells are different, which are 20 ms, 40 ms, 80 ms, respectively, and RATs thereof are also different.

In the relevant art in FIG. 14A, for inter-RAT measurement, a GAP needs to be configured. As a position of a time window for transmitting the SS blocks is not predefined, a serving cell is unable to determine positions of time windows transmitting SS blocks of neighboring cells, and is unable to make the UE perform reliable cell search and measurement, and the UE can only adopt a search window of a maximum length of 80 ms, which will increase a search time of the UE. It should be noted that it is assumed here that a maximum possible SS burst set period is 80 ms, and if a maximum possible SS burst set period is 160 ms, the UE can only perform cell search according to a search window of 160 ms, even if cells around the UE adopt a maximum period of 80 ms.

As shown in FIG. 14B, in an embodiment, different transmission periods have time windows of a common predetermined position, and a GAP length of approximate 5 ms to 6 ms may be configured for the UE, and the UE may perform cell search and measurement quickly. Hence, UE cell search and measurement time is reduced, complexity at the UE is lowered, power consumption of the UE is lowered, cell handover is sped up, communication interruption is avoided, and at least one of currently existing problems is solved. Reference may be made to Embodiment 1 or 2 for a particular manner for defining the predetermined position, which shall not be described herein any further.

The predetermined position is described above with reference to the accompanying drawings by taking 20 ms, 40 ms, 80 ms as examples; however, this embodiment is not limited thereto.

With these embodiments, for any synchronization signal block transmission periods, a position of a time window for transmitting SS blocks is pre-defined, or a position of a time window for transmitting SS blocks is configured by a network equipment, and the UE is caused to perform SS block detection within the time window of the predetermined position. Hence, UE cell search and measurement time is reduced, complexity at the UE is lowered, power consumption of the UE is lowered, cell handover is sped up, communication interruption is avoided, and at least one of currently existing problems is solved.

Embodiment 5

Embodiment 5 provides a signal transmission apparatus. As a principle of the apparatus for solving problems is similar to that of the method in Embodiment 1, reference may be made to the implementation of the method in Embodiment 1 for implementation of the apparatus, with identical contents being not going to be described herein any further.

FIG. 15 is a schematic diagram of a structure of the signal transmission apparatus. As shown in FIG. 15, a signal transmission apparatus 1500 includes:

a transmitting unit 1501 configured to transmit a synchronization signal (SS) block to a user equipment within a time window of a predetermined position in an SS block transmission period.

Reference may be made to Embodiment 1 for a particular manner for defining the predetermined position, which shall not be described herein any further.

In an embodiment, the SS block transmission period is an SS burst set transmission period, or a time interval of a predetermined length. Reference may be made to Embodiment 1 for a particular implementation thereof, which shall not be described herein any further.

In an embodiment, the apparatus may further include:
a first storing unit (not shown in figures) configured to store a predetermined transmission period and a corresponding predetermined position thereof.

In an embodiment, reference may be made to Embodiment 1 for implementations of the transmitting unit 1501 and the first storing unit, which shall not be described herein any further.

With these embodiments, for any synchronization signal block transmission period, the position of the time window for transmitting the SS block is predefined, or the position of the time window for transmitting the SS block is configured by the network equipment, so that the UE may perform SS block detection in the time window at the predetermined position, thereby reducing cell search and measurement time of the UE, lowering the complexity of the UE in processing, lowering power consumption of the UE, speeding up cell handover, avoiding communication interruption, and solving at least one of the existing problems.

Embodiment 6

Embodiment 6 provides a signal transmission apparatus. As a principle of the apparatus for solving problems is similar to that of the method in Embodiment 2, reference may be made to the implementation of the method in Embodiment 2 for implementation of the apparatus, with identical contents being not going to be described herein any further.

FIG. 16 is a schematic diagram of a structure of the signal transmission apparatus. As shown in FIG. 16, a signal transmission apparatus 1600 includes:

a configuring unit 1601 configured to, within an SS block transmission period, configure a predetermined position of a time window for transmitting one or more SS blocks; and a transmitting unit 1602 configured to transmit a synchronization signal (SS) block to a user equipment within a time window of a predetermined position in the SS block transmission period.

In an embodiment, the apparatus 1600 may further include:

a notifying unit 1603 configured to transmit relevant information of the SS blocks to a neighboring cell, the relevant information including the predetermined position.

In an embodiment, reference may be made to steps 501-503 in Embodiment 2 for particular implementations of the configuring unit 1601, the transmitting unit 1602 and the notifying unit 1603, which shall not be described herein any further.

In an embodiment, the configuring unit 1601 may further be configured to transmit configuration information to the UE, the configuration information including the predetermined position. Reference may be made to Embodiment 2 for a particular implementation thereof, which shall not be described herein any further.

FIG. 17 is a schematic diagram of the signal transmission apparatus in Embodiment 6. As shown in FIG. 17, a signal transmission apparatus 1700 includes:

a configuring unit 1701 configured to, within an SS block transmission period, configure a predetermined position of a time window for transmitting one or more SS blocks;

a requesting unit 1702 configured to transmit an SS block coordination request message to a neighboring cell, the coordination request message including a target predetermined position of a time window for transmitting one or more SS blocks; and a transmitting unit 1703 configured to transmit one or more SS blocks to a user equipment within the time window of the target predetermined position when a coordination acknowledgement message fed back by the neighboring cell is received.

In an embodiment, reference may be made to steps 501'-503' in Embodiment 2 for particular implementations of the configuring unit 1701, the requesting unit 1702 and the transmitting unit 1703, which shall not be described herein any further.

In an embodiment, the apparatus 1700 may further include:

a first receiving unit 1704 (optional) configured to receive a coordination acknowledgement message fed back by the neighboring cell.

Or, the first receiving unit 1704 may be configured to receive a coordination rejection message fed back by the neighboring cell.

In an embodiment, the transmitting unit 1703 may further be configured to notify the UE of configuration information, the configuration information including the predetermined position. Reference may be made to Embodiment 2 for a particular implementation thereof, which shall not be described herein any further.

With these embodiments, for any synchronization signal block transmission period, the position of the time window for transmitting the SS block is predefined, or the position of the time window for transmitting the SS block is configured by the network equipment, so that the UE may perform SS block detection in the time window at the predetermined position, thereby reducing cell search and measurement time of the UE, lowering the complexity of the UE in processing, lowering power consumption of the UE, speeding up cell handover, avoiding communication interruption, and solving at least one of the existing problems.

Embodiment 7

Embodiment 7 provides a signal transmission apparatus. As a principle of the apparatus for solving problems is similar to that of the method in Embodiment 3, reference may be made to the implementation of the method in Embodiment 3 for implementation of the apparatus, with identical contents being not going to be described herein any further.

FIG. 18 is a schematic diagram of a structure of the signal transmission apparatus. As shown in FIG. 18, a signal transmission apparatus 1800 includes:

a second receiving unit 1801 configured to receive relevant information or a coordination request message transmitted by a network equipment of a serving cell.
in an embodiment, reference may be made to Embodiment 2 for particular implementations the relevant information or the coordination request message, which shall not be described herein any further;

an adjusting unit 1802 configured to adjust a position of a time window transmitting one or more SS blocks to be identical to the predetermined position according to the relevant information or the coordination request message.

When there exists an SFN deviation between cells, as the SFN deviation is taken into account in configuring the predetermined position, when the adjusting unit 1802 adjusts the position of the time window to the predetermined position, the SFN deviation may be corrected (compensated), so as to ensure that time windows transmitting SS blocks between cells are aligned.

In an embodiment, when it is determined according to the coordination request message that the position of the time window transmitting the SS blocks may be adjusted, the apparatus may further include:

a feedback unit 1803 configured to feed back a coordination acknowledgement message to the network equipment of the serving cell.

In an embodiment, when it is determined according to the coordination request message that the position of the time window transmitting the SS blocks may not be adjusted, the feedback unit 1803 may feed back a coordination rejection message, or not transmit any message, to the network equipment of the serving cell.

With these embodiments, for any synchronization signal block transmission periods, the position of the time window for transmitting the SS blocks is configured by the network equipment, so that the UE performs SS block detection in the time window of the predetermined position. Hence, flexibility of transmission of the SS blocks is increased, cell search and measurement time by the UE is reduced, complexity at the UE is lowered, power consumption of the UE is lowered, cell handover is sped up, communication interruption is avoided, and at least one of currently existing problems is solved.

Embodiment 8

These embodiments provide a network equipment (not shown), including the above-described signal transmission apparatus 1500-1700, structures and functions of which being as described in Embodiment 5 or 6, which shall not be described herein any further.

Embodiment 8 further provides a network equipment. As a principle of the device for solving problems is similar to that of the method in Embodiment 1 or 2, reference may be made to the implementation of the method in Embodiment 1 or 2 for implementation of the device, with identical contents being not going to be described herein any further.

FIG. 19 is a schematic diagram of a structure of the network equipment of the embodiment of this disclosure. As shown in FIG. 19, a network equipment 1900 may include a central processing unit 1901 (CPU) and a memory 1902, the memory 1902 being coupled to the central processing unit 1901. The memory 1902 may store various data, and furthermore, it may store a program for data processing, and execute the program under control of the central processing unit 1901, so as to transmit one or more SS blocks.

In one embodiment, the functions of the signal transmission apparatus 1500-1700 may be integrated into the central processing unit 1901, the central processing unit 1901 may be configured to carry out the signal transmission method described in Embodiment 1 or 2.

For example, the central processing unit 1901 may be configured to: transmit a synchronization signal (SS) block to a user equipment within a time window of a predetermined position in an SS block transmission period.

For example, the central processing unit 1901 may be configured to: configure the predetermined position.

For example, the central processing unit 1901 may be configured to: transmit an SS block coordination request message including the predetermined position to a neighboring cell.

For example, the central processing unit 1901 may be configured to: transmit configuration information to the UE, the configuration information including the predetermined position.

Furthermore, reference may be made to Embodiment 1 or 2 for a particular manner for defining the predetermined position, which shall not be described herein any further.

The SS block transmission period is an SS burst set period, or a time interval of a predetermined length. Reference may be made to Embodiment 1 or 2 for a particular implementation of the predetermined length, which shall not be described herein any further.

In another embodiment, the signal transmission apparatus 1500-1700 and the central processing unit 1901 may be configured separately; for example, the signal transmission apparatus 1500-1700 may be configured as a chip connected to the central processing unit 1901, such as the units shown in FIG. 19, and the functions of the signal transmission apparatus 1500-1700 are executed under control of the central processing unit 1901.

Furthermore, as shown in FIG. 19, the network equipment 1900 may further include a transceiving unit 1903, and an antenna 1904, etc.; functions of the above components are similar to those in the relevant art, which shall not be described herein any further. It should be noted that the network equipment 1900 does not necessarily include all the parts shown in FIG. 19, and furthermore, the network equipment 1900 may include parts not shown in FIG. 19, and the relevant art may be referred to.

With these embodiments, for any synchronization signal block transmission period, the position of the time window for transmitting the SS block is predefined, or the position of the time window for transmitting the SS block is configured by the network equipment, so that the UE may perform SS block detection in the time window at the predetermined position, thereby reducing cell search and measurement time of the UE, lowering the complexity of the UE in processing, lowering power consumption of the UE, speeding up cell handover, avoiding communication interruption, and solving at least one of the existing problems.

Embodiment 9

These embodiments provide a network equipment (not shown), including the above-described signal transmission apparatus 1800, a structure and functions of which being as described in Embodiment 7, which shall not be described herein any further.

Embodiment 9 further provides a network equipment. As a principle of the device for solving problems is similar to that of the method in Embodiment 3, reference may be made to the implementation of the method in Embodiment 3 for implementation of the device, with identical contents being not going to be described herein any further.

FIG. 20 is a schematic diagram of a structure of the network equipment of the embodiment of this disclosure. As shown in FIG. 20, a network equipment 2000 may include a central processing unit 2001 (CPU) and a memory 2002, the memory 2002 being coupled to the central processing unit 2001. The memory 2002 may store various data, and furthermore, it may store a program for data processing, and execute the program under control of the central processing unit 2001, so as to transmit one or more SS blocks.

In one embodiment, the functions of the signal transmission apparatus 1800 may be integrated into the central processing unit 2001, the central processing unit 2001 may be configured to carry out the signal transmission method described in Embodiment 3.

For example, the central processing unit 2001 may be configured to: receive relevant information or a coordination request message transmitted by a network equipment of a serving cell, and adjust a position of a time window transmitting one or more SS blocks to be identical to the predetermined position according to the relevant information or the coordination request message.

For example, the central processing unit 2001 may be configured to: feed back a coordination acknowledgement message to the network equipment of the serving cell, or feed back a coordination rejection message, or not transmit any message, to the network equipment of the serving cell.

In another embodiment, the signal transmission apparatus 1800 and the central processing unit 2001 may be configured separately; for example, the signal transmission apparatus 1800 may be configured as a chip connected to the central processing unit 2001, such as the units shown in FIG. 20, and the functions of the signal transmission apparatus 1800 are executed under control of the central processing unit 2001.

Furthermore, as shown in FIG. 20, the network equipment 2000 may further include a transceiving unit 2003, and an antenna 2004, etc.; functions of the above components are similar to those in the relevant art, which shall not be described herein any further. It should be noted that the network equipment 2000 does not necessarily include all the parts shown in FIG. 20, and furthermore, the network equipment 2000 may include parts not shown in FIG. 20, and the relevant art may be referred to.

With these embodiments, for any synchronization signal block transmission period, the position of the time window for transmitting the SS block is predefined, or the position of the time window for transmitting the SS block is configured by the network equipment, so that the UE may perform SS block detection in the time window at the predetermined position, thereby reducing cell search and measurement time of the UE, lowering the complexity of the UE in processing, lowering power consumption of the UE, speeding up cell handover, avoiding communication interruption, and solving at least one of the existing problems.

Embodiment 10

Embodiment 10 provides a signal detection apparatus. As a principle of the apparatus for solving problems is similar to that of the method in Embodiment 4, reference may be made to the implementation of the method in Embodiment 4 for implementation of the apparatus, with identical contents being not going to be described herein any further.

FIG. 21 is a schematic diagram of a structure of the signal detection apparatus. As shown in FIG. 21, a signal detection apparatus 2100 includes:

a detecting unit 2101 configured to detect a synchronization signal (SS) block within a time window of a predetermined position in an SS block transmission period. Reference may be made to Embodiment 1 or 2 for a particular manner for defining the predetermined position, which shall not be described herein any further.

The SS block transmission period is an SS burst set period, or a time interval of a predetermined length. Reference may be made to Embodiment 1 for a particular implementation thereof, which shall not be described herein any further.

In an embodiment, the apparatus may further include:
a processing unit 2102 configured to perform subsequent processing according to the detected SS block.

In an embodiment, the apparatus may further include:
a second storing unit (not shown) configured to store a predetermined SS block transmission period and its corresponding predetermined position.

In an embodiment, reference may be made to Embodiment 4 for particular implementations of the detecting unit 2101, the processing unit 2102 and the second storing unit, which shall not be described herein any further.

In an embodiment, the apparatus may further include:
a third receiving unit (not shown) configured to configuration information transmitted by a network equipment, the configuration information including the predetermined position.

With these embodiments, for any synchronization signal block transmission period, the position of the time window for transmitting the SS block is predefined, or the position of the time window for transmitting the SS block is configured by the network equipment, so that the UE may perform SS block detection in the time window at the predetermined position, thereby reducing cell search and measurement time of the UE, lowering the complexity of the UE in processing, lowering power consumption of the UE, speeding up cell handover, avoiding communication interruption, and solving at least one of the existing problems.

Embodiment 11

These embodiments provide a UE (not shown), including the above signal detection apparatus 2100, a structure and functions of which being as described in Embodiment 10, which shall not be described herein any further.

Embodiment 11 further provides a UE. As a principle of the UE for solving problems is similar to that of the method in Embodiment 4, reference may be made to the implementation of the method in Embodiment 4 for implementation of the UE, with identical contents being not going to be described herein any further.

FIG. 22 is a schematic diagram of a structure of the UE of the embodiment of this disclosure. As shown in FIG. 22, a UE 2200 may include a central processing unit 2201 (CPU) and a memory 2202, the memory 2202 being coupled to the central processing unit 2201. The memory 2202 may store various data, and furthermore, it may store a program for data processing, and execute the program under control of the central processing unit 2201, so as to detect SS blocks.

In one embodiment, the functions of the signal detection apparatus 2100 may be integrated into the central processing unit 2201, the central processing unit 2201 may be configured to carry out the signal detection method described in Embodiment 4.

For example, the central processing unit 2201 may be configured to: detect a synchronization signal (SS) block within a time window of a predetermined position in an SS block transmission period.

Furthermore, reference may be made to Embodiment 1 or 2 for a particular manner for defining the predetermined position, which shall not be described herein any further.

The SS block transmission period is an SS burst set period, or a time interval of a predetermined length. Reference may be made to Embodiment 1 or 2 for a particular implementation thereof, which shall not be described herein any further.

For example, the central processing unit 2201 may further be configured to: receive configuration information transmitted by a network equipment, the configuration information including the predetermined position.

In another embodiment, the above apparatus 2100 and the central processing unit 2201 may be configured separately; for example, the apparatus 2100 may be configured as a chip connected to the central processing unit 2201, such as the units shown in FIG. 22, and the functions of the apparatus 2100 are executed under control of the central processing unit 2201.

Furthermore, as shown in FIG. 22, the UE 2200 may further include a communication module 2203, an input unit 2204, a display 2206, an audio processor 2205, an antenna 2201, and a power supply 2208, etc.; functions of the above components are similar to those in the relevant art, which shall not be described herein any further. It should be noted that the UE 2200 does not necessarily include all the parts shown in FIG. 22, and the above components are not necessary; and furthermore, the UE 2200 may include parts not shown in FIG. 22, and the relevant art may be referred to.

With these embodiments, for any synchronization signal block transmission period, the position of the time window for transmitting the SS block is predefined, or the position of the time window for transmitting the SS block is configured by the network equipment, so that the UE may perform SS block detection in the time window at the predetermined position, thereby reducing cell search and measurement time of the UE, lowering the complexity of the UE in processing, lowering power consumption of the UE, speeding up cell handover, avoiding communication interruption, and solving at least one of the existing problems.

Embodiment 12

Embodiment 12 provides a communication system.

FIG. 23 is a schematic diagram of a structure of the communication system in Embodiment 12. As shown in FIG. 23, a communication system 2300 includes a first network equipment (such as a base station) 2301 and one or more UEs 2302 of one more serving cells.

Reference may be made to the network equipment 1900 in Embodiment 8 for a particular implementation of the network equipment 2301, and reference may be made to the UE 2200 in Embodiment 11 for a particular implementation of the UE 2302, the contents of which being incorporated herein, which shall not be described herein any further.

In an embodiment, the communication system may further include a second network equipment 2303 (such as a base station) of one or more neighboring cells, and reference may be made to the network equipment 2000 in Embodiment 9 for a particular implementation of the network equipment 2303, the contents of which being incorporated herein, which shall not be described herein any further.

FIG. 24 is a flowchart of the signal transmission detection method in an embodiment, which shall be described by taking that an SS block transmission period is an SS burst set transmission period as an example. As shown in FIG. 24, the method includes:
step 2401: a plurality of base stations 2301 of a plurality of cells transmit one or more SS blocks to the UEs 2302 within time windows of predetermined positions in respective SS burst transmission periods;
a structure of the SS block is as shown in FIG. 2, which shall not be described herein any further.
step 2402: the base station of the serving cell configures measurement-related information for the UE via RRC signaling, such as a designated carrier frequency, a position of a measurement window, a length of the measurement window, a period/frequency of measurement or the measurement window, a given cell list, a type of a measurement report, etc. In particular, for measurement of inter-frequency or inter-RAT, information on a GAP (a time period of measurement from a current frequency point to another frequency point) (such as a position, length, period, etc., of the GAP) needs to be configured.

The above position and period of the measurement window may be respectively configured according to the predetermined position of the time window transmitting the transmission synchronization signal (SS) blocks and the period of the predetermined position (SS burst set period), so that the measurement is performed at the predetermined positions, and the UE may observe more neighboring cells. The above method is applicable to a scenario in which a synchronization network or a neighboring cell is synchronized; however, this embodiment is not limited thereto.

Hence, according to the measurement configuration, or based on the measurement configuration when signal quality of an own cell is not good, the UE initiates the cell detection process of step 2403.

Step 2403: the UE detects the SS blocks in a time window of the predetermined position. Generally, a received signal needs to be performed filtering processing based on a synchronization signal bandwidth, and then the UE uses a PSS copy to perform correlation detection on the received signal, detects a PSS that is greater than a threshold and determines timing information. Based on the timing information, position information of the SSS may be obtained, and SSS signal detection is further performed. Finally, a Cell ID of a neighboring cell that the UE can observe is determined by combining detection results of the PSS and SSS. Reference may be made to Embodiment 1 for a definition of the predetermined position. Reference may be made to Embodiment 1 for a manner of defining the predetermined position, and reference may be made to the scenarios in FIGS. 11B, 12B, 13B and 14B for a particular implementation of step 2403, which shall not be described herein any further.

Step 2404: beam information is obtained and/or signal quality measurement is performed on the SS block to which the detected Cell ID corresponds; the beam information may be obtained by using SS block index information carried in a PBCH or a PBCH DMRS; however, this embodiment is not limited thereto, and cell quality information based on the synchronization signal and the cell beam quality information, such as RSRP (reference signal receiving power), etc., are determined by measurement. Or, the cell quality information, and the cell beam quality information, etc., are obtained together based on the synchronization signal and the PBCH DMRS; however, this embodiment is not limited thereto. For cell-level signal quality information, it is needed to transfer from layer 1 (L1) to layer 3 (L3) for further L3 filtering.

Step 2405: the UE periodically reports the measurement result, or reports the measurement result when a triggering event occurs. For example, a measurement result of L3 in combination with the information of the measurement configuration are periodically reported to the network equipment (such as a base station), or is reported to the base station when a trigger event occurs, such as an A3 event. After receiving the information, the base station initiates a process, such as cell handover.

FIG. 25 is a flowchart of the signal transmission detection method in an embodiment, which shall be described by taking that an SS block transmission period is an SS burst set transmission period as an example. As shown in FIG. 25, the method includes:

step: 2501: the base station 2301 of the serving cell configures a predetermined position of a time window for transmitting one or more SS blocks;

step 2502: the base station 2301 of the serving cell transmits information including the predetermined position to the base station 2303 of the neighboring cell;

the information may be relevant information or a coordination request message, and reference may be made to Embodiment 2 for a particular implementation thereof, which shall not be described herein any further;

step 2503: the base station 2303 of the neighboring cell determines according to the information whether the position of the time window for transmitting one or more SS blocks of its own is able to be adjusted;

step 2504: when the position is able to be adjusted, the base station 2303 of the neighboring cell adjusts the position of the time window for transmitting the SS blocks to be identical to the predetermined position according to the predetermined position;

when there exists an SFN deviation between the cells, as the SFN deviation is taken into account in configuring the predetermined position, the SFN deviation may be corrected (compensated) in adjusting the position of the time window to the predetermined position in step 2504, so as to ensure that the time windows for transmitting the SS blocks between the cells are aligned;

step 2505 (optional): the base station 2303 of the neighboring cell transmits a coordination acknowledgement message to the base station 2301 of the serving cell;

alternatively, if it is determined in step 2503 that the predetermined position of the time window for transmitting the SS blocks of itself is unable to be adjusted according to the information, the method may further include (not shown, optional): transmitting a coordination rejection message by the base station 2303 of the neighboring cell to the base station 2301 of the serving cell;

step 2506: the base station 2303 of the neighboring cell transmits one or more SS blocks to the UE 2302 within the time window of the predetermined position;

step 2507: the base station of the serving cell configures information on measurement for the UE via RRC signaling, such as a designated carrier frequency, a position of a measurement window, a length of the measurement window, a period/frequency of measurement or the measurement window, a given cell list, a type of measurement report. In particular, for measurement of inter-frequency or inter-RAT, information on a GAP (a time period of measurement from a current frequency point to another frequency point) (such as a position, length, period, etc., of the GAP) needs to be configured.

The above position and period of the measurement window may be respectively configured according to the predetermined position of the time window transmitting the transmission synchronization signal (SS) blocks and the period of the predetermined position (SS burst set period), so that the measurement is performed at the predetermined positions, and the UE may observe more neighboring cells; the above method is applicable to a scenario in which a synchronization network or a neighboring cell is synchronized; however, this embodiment is not limited thereto; in step 2507, the base station of the serving cell may further notify the UE of the predetermined position.

Hence, according to the measurement configuration, or based on the measurement configuration when the signal quality of the own cell is not good, the UE initiates the cell detection process of step 2508;

step 2508: the UE detects the SS block in the time window of the predetermined position; generally, a received signal needs to be performed filtering processing based on a synchronization signal bandwidth, and then the UE uses a PSS copy to perform correlation detection on the received signal, detects a PSS that is greater than a threshold and determines timing information; based on the timing information, position information of the SSS may be obtained, and SSS signal detection is further performed; finally, a Cell ID of a neighboring cell that the UE can observe is determined by combining detection results of the PSS and SSS; Reference may be made to Embodiment 2 for a definition of the predetermined position, and reference may be made the scenarios in FIGS. 5B, 6B and 7B for a particular implementation of step 2508, which shall not be described herein any further;

step 2509: beam information is obtained and/or signal quality measurement is performed on the SS block to which the detected Cell ID corresponds; the beam information may be obtained by using SS block index information carried in a PBCH or a PBCH DMRS; however, this embodiment is not limited thereto, and cell quality information based on the synchronization signal and the cell beam quality information, such as RSRP (reference signal receiving power), etc., are determined by measurement; or, the cell quality information, and the cell beam quality information, etc., are obtained together based on the synchronization signal and the PBCH DMRS; however, this embodiment is not limited thereto; for cell-level signal quality information, it is needed to transfer from layer 1 (L1) to layer 3 (L3) for further L3 filtering; and step 2510: the UE periodically reports the measurement result, or reports the measurement result when a triggering event occurs; for example, a measurement result of L3 in combination with the information of the measurement configuration are periodically reported to the network equipment (such as a base station), or is reported to the base station when a trigger event occurs, such as an A3 event; and after receiving the information, the base station initiates a process, such as cell handover, etc.

With these embodiments, for any synchronization signal block transmission period, the position of the time window for transmitting the SS block is predefined, or the position of the time window for transmitting the SS block is configured by the network equipment, so that the UE may perform SS block detection in the time window at the predetermined position, thereby reducing cell search and measurement time of the UE, lowering the complexity of the UE in processing, lowering power consumption of the UE, speeding up cell handover, avoiding communication interruption, and solving at least one of the existing problems.

An embodiment of the present disclosure provides a computer storage medium, including a computer readable program code, which may cause a signal transmission apparatus or a network equipment to carry out the signal transmission method as described in Embodiment 1, or 2, or 3.

An embodiment of the present disclosure provides a computer readable program code, which, when executed in a signal transmission apparatus or a network equipment, may cause the signal transmission apparatus or the network equipment to carry out the signal transmission method as described in Embodiment 1, or 2, or 3.

An embodiment of the present disclosure provides a computer storage medium, including a computer readable program code, which may cause a signal detection apparatus or a UE to carry out the signal detection method as described in Embodiment 4.

An embodiment of the present disclosure provides a computer readable program code, which, when executed in a signal detection apparatus or a UE, may cause the signal detection apparatus or the UE to carry out the signal detection method as described in Embodiment 4.

The above apparatuses and methods of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 15-22 may either correspond to software modules of procedures of a computer program, or correspond to hardware modules. Such software modules may respectively correspond to the steps shown in FIGS. 3, 5A-5B, 9-10 and 24-25. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 15-22 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 15-22 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A terminal comprising:
a memory; and
a processor coupled to the memory and configured to:
receive, from a first network device, an indication information relating to a predetermined position of a time window for a first synchronization signal (SS) block from a plurality of predetermined positions of the time window, the predetermined position being indicated by a period of a transmission of the first SS block and a time length from a starting position of the period,
receive the first SS block from the first network device or a second SS block from a second network device within the time window of the predetermined position in the period, wherein
the indication information relating to the predetermined position is included in measurement timing information that is transfer from the first network device to the second network device of a neighboring cell.

2. The terminal according to claim 1, wherein the predetermined position is located in a former half or a latter half of each frame in the period, a length of the time window of the predetermined position is 5 ms.

3. The terminal according to claim 1, the processor is further configured to measure a quality of a signal according to the second SS block that is transmitted by the second network device according to the measurement timing information.

4. The terminal according to claim 1, wherein the period is an SS burst set transmission period, or a time interval of a predetermined length.

5. The terminal according to claim 1, wherein the measurement timing configuration information includes cell ID and periodicity information relating to the period.

6. A network device comprising:
a memory; and
a processor coupled to the memory and configured to:
transmit, to a terminal, an indication information relating to a predetermined position of a time window for a first synchronization signal (SS) block from a plurality of predetermined positions of the time window, the predetermined position being indicated by a period of a transmission of the first SS block and a time length from a starting position of the period,
transmit the first SS block to the terminal within the time window of the predetermined position in the period, wherein
the indication information relating to the predetermined position is included in measurement timing information that is transfer from the network device to another network device of a neighboring cell.

7. The network device according to claim 6, wherein the predetermined position is located in a former half or a latter half of each frame in the period, a length of the time window of the predetermined position is 5 ms.

8. The network device according to claim 6, wherein the period is an SS burst set transmission period, or a time interval of a predetermined length.

9. The network device according to claim 6, wherein the measurement timing configuration information includes cell ID and periodicity information relating to the period.

10. The network device according to claim 6, wherein the processor is further configured to store a predetermined SS block transmission period and a corresponding predetermined position thereof.

11. The network device according to claim 6, wherein the processor is further configured to the predetermined position.

12. A communication system comprising:
a terminal; and
a first network device configured to:
transmit, to a terminal, an indication information relating to a predetermined position of a time window for a synchronization signal (SS) block from a plurality of predetermined positions of the time window, the predetermined position being indicated by a period of a transmission of the SS block and a time length from a starting position of the period,
transmit the SS block to the terminal within the time window of the predetermined position in the period; and
a second network device configured receive measurement timing information including the indication information relating to the predetermined position from the first network device.

* * * * *